US009380600B2

(12) United States Patent
Lohr et al.

(10) Patent No.: US 9,380,600 B2
(45) Date of Patent: *Jun. 28, 2016

(54) SEMI-PERSISTENT SCHEDULED RESOURCE RELEASE PROCEDURE IN A MOBILE COMMUNICATION NETWORK

(71) Applicant: Optis Wireless Technology, LLC, Plano, TX (US)

(72) Inventors: Joachim Lohr, Wiesbaden (DE); Alexander Golitschek Edler Von Elbwart, Darmstadt (DE); Martin Feuersanger, Bremen (DE); Christian Wengerter, Kleinheubach (DE)

(73) Assignee: Optis Wireless Technology, LLC, Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/791,569

(22) Filed: Jul. 6, 2015

(65) Prior Publication Data

US 2015/0312935 A1  Oct. 29, 2015

Related U.S. Application Data

(63) Continuation of application No. 13/633,792, filed on Oct. 2, 2012, now Pat. No. 9,094,965, which is a continuation of application No. 13/062,674, filed as application No. PCT/EP2009/005831 on Aug. 11, 2009, now Pat. No. 8,320,319.

(30) Foreign Application Priority Data

Sep. 17, 2008 (EP) ..................................... 08016365
Dec. 19, 2008 (EP) ..................................... 08022171

(51) Int. Cl.
*H04W 4/00* (2009.01)
*H04W 72/12* (2009.01)
(Continued)

(52) U.S. Cl.
CPC .......... *H04W 72/1289* (2013.01); *H04L 1/1607* (2013.01); *H04L 1/1812* (2013.01); *H04W 72/042* (2013.01)

(58) Field of Classification Search
None
See application file for complete search history.

(56) References Cited

U.S. PATENT DOCUMENTS 8,009,606 B2 * 8/2011 Seo et al. ...................... 370/319
8,320,319 B2   11/2012 Lohr et al.
(Continued)

FOREIGN PATENT DOCUMENTS

| CN | 101060690 | 10/2007 |
| RU | 2007106451 | 8/2008 |
| WO | 2007/065272 | 6/2007 |

OTHER PUBLICATIONS

NTT DocCoMo, Inc., 3GPP TSG RAN WG2 #61bis, R2-081859 "UL semi-persistent resource deactivation" Mar. 31-Apr. 4, 2008, 2 pages.
(Continued)

*Primary Examiner* — Kibrom T Hailu
(74) *Attorney, Agent, or Firm* — Nixon & Vanderhye P.C.

(57) ABSTRACT

A semi-persistent resource scheduling (SPS) allocation of a user equipment is deactivated in an LTE-based mobile communication system without requiring changes to the Physical layer-to-MAC layer interface and/or changes to PDCCH formats agreed by the 3GPP. A combination of NDI value and MCS index is defined that commands release of SPS resources. An alternative solution proposed defines a special transport block size that when signaled in a PDCCH commands release of SPS resources.

18 Claims, 9 Drawing Sheets

(51) Int. Cl.
  *H04W 72/04* (2009.01)
  *H04L 1/16* (2006.01)
  *H04L 1/18* (2006.01)

(56) References Cited

U.S. PATENT DOCUMENTS

| | | | |
|---|---|---|---|
| 2004/0013096 | A1 | 1/2004 | Marinier et al. |
| 2006/0034173 | A1 | 2/2006 | Teague et al. |
| 2007/0242636 | A1 | 10/2007 | Kashima et al. |
| 2008/0192674 | A1 | 8/2008 | Wang et al. |
| 2008/0225783 | A1 | 9/2008 | Wang et al. |
| 2008/0285512 | A1* | 11/2008 | Pan et al. .................. 370/329 |
| 2009/0232309 | A1* | 9/2009 | Montojo et al. ............ 380/270 |
| 2009/0268693 | A1* | 10/2009 | Lindh et al. ................ 370/336 |
| 2010/0027460 | A1* | 2/2010 | Kim et al. .................. 370/315 |
| 2001/0083066 | | 4/2011 | Chung et al. |
| 2011/0194502 | A1 | 8/2011 | Sung et al. |

OTHER PUBLICATIONS

Chinese Office Action dated Apr. 18, 2013, for corresponding CN Application No. 2009801354424, 6 pages.
English translation of Russian Office Action, dated Dec. 3, 2013, for corresponding Russian Application No. 2011109025/07(013065), 6 pages.
Russian Office Action dated Mar. 11, 2013, for counterpart Russian Application No. 2011109025/07(013065), 5 pages.
Nokia Corporation, Nokia Siemens Networks, "Persistent Scheduling for DL," R2-080683 (R2-080018), 3GPP TSG-RAN WG2 Meeting #61, Agenda item: 5.1.1.8, Sorrento, Italy, Feb. 11-15, 2008, 6 pages.
"3rd Generation Partnership Project; Technical Specification Group Radio Access Network; Requirements for Evolved UTRA (E-UTRA) and Evolved UTRAN (E-UTRAN) (Release 7)," Technical Report, 3GPP TR 25.913 V7.3.0, Mar. 2006, 18 pages.
"3rd Generation Partnership Project; Technical Specification Group Radio Access Network; Feasibility study for evolved Universal Terrestrial Radio Access (UTRA) and Universal Terrestrial Radio Access Network (UTRAN) (Release 7)," Technical Report, 3GPP TR 25.912 V7.2.0, Jun. 2007, 65 pages.
"3rd Generation Partnership Project; Technical Specification Group Radio Access Network; Evolved Universal Terrestrial Radio Access (E-UTRA); Multiplexing and channel coding (Release 8)," Technical Specification, 3GPP TS 36.212 V8.3.0, May 2008, 48 pages.
"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," Technical Specification, 3GPP TS 36.300 V8.5.0, May 2008, 134 pages.
"3rd Generation Partnership Project; Technical Specification Group Radio Access Network; Evolved Universal Terrestrial Radio Access (E-UTRA) Medium Access Control (MAC) protocol specification (Release 8)," Technical Specification, 3GPP TS 36.321 V8.2.0, May 2008, 32 pages.
"3rd Generation Partnership Project; Technical Specification Group Radio Access Network; Evolved Universal Terrestrial Radio Access (E-UTRA); Physical layer procedures (Release 8)," Technical Specification, 3GPP TS 36.213 V8.4.0, Sep. 2008, 60 pages.
International Search Report, dated Dec. 3, 2009, for International Application No. PCT/EP2009/005831, 2 pages.
NTT DoCoMo, Inc., "UL semi-persistent resource deactivation," R2-082483 (resubmission of R2-081859), Agenda Item: 5.1.1.8, 3GPP TSG RAN WG2 #62, Kansas City, MO, USA, May 5-9, 2008, 2 pages.
NTI DoCoMo, Alcatel, Cingular Wireless, CMCC, Ericsson, Fujitsu, Huawei, LG Electronics, Lucent Technologies, Mitsubishi Electric, Motorola, NEC, Nokia, Nortel Networks, Orange, Panasonic, Philips, Qualcomm Europe, Samsung, Sharp Siemens, Telecom Italia, Telefonica, TeliaSonera, T-Mobile, Vodafone, "Proposed Study Item on Evolved UTRA and UTRAN," RP-040461, Agenda Item: 8.12, TSG-RAN Meeting #26, Athens, Greece, Dec. 8-10, 2004, 5 pages.
Panasonic, "Configuaration for semi-persistent scheduling," R2-081575, Agenda Item: 5.1.1.8, 3GPP TSG RAN WG2 #61bis, Shenzhen, China, Mar. 31-Apr. 4, 2008, 4 pages.
Panasonic, "Remaining issues on Persistent scheduling," R2-083311, derived from R2-082228 and R2-082229, Agenda Item: 6.1.1.8, 3GPP TSG RAN WG2 #62bis, Warsaw, Poland, Jun. 30-Jul. 4, 2008, 4 pages.
Philips, NXP, "PDCCH message information content for persistent scheduling," R1-081506, Agenda Item: 6.1.3, 3GPP TSG RAN WG1 Meeting #52bis, Shenzhen, China, Mar. 31-Apr. 4, 2008, 3 pages.
Qualcomm Europe, "Release of semi-persistent resources," R2-082500 (was R2-081828), Agenda Item: 5.1.1.8, 3GPP TSG-RAN WG2 meeting #62, Kansas City, USA, May 5-9, 2008, 2 pages.
Samsung, "C-RNTI and NDI for SPS," R2-084464, Agenda Item: 6.1.1.3, 3GPP TSG-RAN2#63 meeting, Jeju, South Korea, Aug. 18-22, 2008, 3 pages.
Extended European Search Report dated Nov. 26, 2012, for corresponding EP Application No. 12188532.1, 8 pages.
Panasonic, "SPS activation and release," R1-084233, 3GPP TSG-RAN WG1 Meeting #55, Prague, Czech Republic, Nov. 10-14, 2008, 6 pages.
U.S. Appl. No. 13/633,792, filed Oct. 2, 2012, Lohr et al.
Office Action mailed May 2, 2014 in co-pending U.S. Appl. No. 13/633,792 30 pages.
Office Action mailed Aug. 15, 2014 in co-pending U.S. Appl. No. 13/633,792 8 pages.
Office Action mailed Dec. 3, 2014 in co-pending U.S. Appl. No. 13/633,792 12 pages.
Extended European Search Report dated Apr. 18, 2016 issued in EP 16151808.9, 10 pages.

* cited by examiner

| SPS Interval [ms] | min TBS [bits] | max TBS [bits] | release TBS [bits] |

| SPS Interval [ms] | min TBS [bits] | max TBS [bits] | UL release TBS [bits] |
| DL release TBS [bits] | UL&DL release TBS [bits] | | |

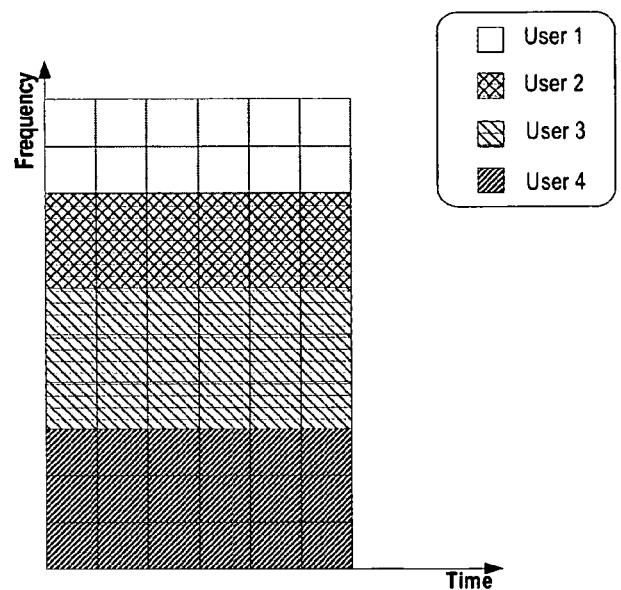
Fig. 3
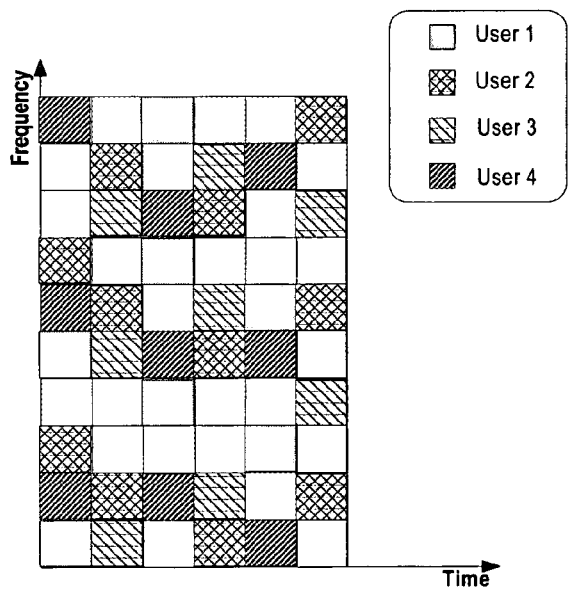
Fig. 4
| UL | RB | TBS | FH | Cyclic shift | NDI | TPC | CQI | CRC |
Fig. 5

SEMI-PERSISTENT SCHEDULED RESOURCE RELEASE PROCEDURE IN A MOBILE COMMUNICATION NETWORK

This application is a continuation of U.S. patent application Ser. No. 13/633,792, filed Oct. 2, 2012, which is a continuation of U.S. patent application Ser. No. 13/062,674, filed May 13, 2011 (now U.S. Pat. No. 8,320,319), which is the U.S. national phase of International Application No. PCT/EP2009/005831 filed Aug. 11, 2009, which designated the U.S. and claims priority to EP 08016365.2 filed Sep. 17, 2008 and EP 08022171.6 filed Dec. 19, 2008, the entire contents of each of which are incorporated herein by reference.

FIELD

The invention relates to a method for deactivating a semi-persistent resource allocation of a user equipment in an LTE-based mobile communication system. Furthermore, the invention also related to a user equipment and an eNode B implementing this method.

TECHNICAL BACKGROUND

Long Term Evolution (LTE)

Third-generation mobile systems (3G) based on WCDMA (Wideband Code Division Multiple Access) radio-access technology are being deployed on a broad scale all around the world. A first step in enhancing or evolving this technology entails introducing High-Speed Downlink Packet Access (HSDPA) and an enhanced uplink, also referred to as High Speed Uplink Packet Access (HSUPA), giving a radio-access technology that is highly competitive.

In a longer time perspective it is, however, necessary to be prepared for further increasing user demands and an even tougher competition from new radio access technologies. To meet this challenge, 3GPP has initiated the study item Evolved UTRA and UTRAN (see 3GPP Tdoc. RP-040461, "Proposed Study Item on Evolved UTRA and UTRAN", and 3GPP TR 25.912: "Feasibility study for evolved Universal Terrestrial Radio Access (UTRA) and Universal Terrestrial Radio Access Network (UTRAN)", version 7.2.0, June 2007, available at http://www.3gpp.org and both being incorporated herein by reference), aiming at studying means to achieve additional substantial leaps in terms of service provisioning and cost reduction. As a basis for this work, 3GPP has concluded on a set of targets and requirements for this long-term evolution (LTE) (see 3GPP TR 25.913, "Requirements for Evolved UTRA and Evolved UTRAN", version 7.3.0, March 2006, available at http://www.3gpp.org, incorporated herein by reference) including for example:

Peak data rates exceeding 100 Mbps for the downlink direction and 50 Mbps for the uplink direction.

Mean user throughput improved by factors 2 and 3 for uplink and downlink respectively.

Cell-edge user throughput improved by a factor 2 for uplink and downlink.

Uplink and downlink spectrum efficiency improved by factors 2 and 3 respectively.

Significantly reduced control-plane latency.

Reduced cost for operator and end user.

Spectrum flexibility, enabling deployment in many different spectrum allocations.

The ability to provide high bit rates is a key measure for LTE. Multiple parallel data stream transmission to a single terminal, using multiple-input-multiple-output (MIMO) techniques, is one important component to reach this. Larger transmission bandwidth and at the same time flexible spectrum allocation are other pieces to consider when deciding what radio access technique to use. The choice of adaptive multi-layer OFDM, AML-OFDM, in downlink will not only facilitate to operate at different bandwidths in general but also large bandwidths for high data rates in particular. Varying spectrum allocations, ranging from 1.25 MHz to 20 MHz, are supported by allocating corresponding numbers of AML-OFDM subcarriers. Operation in both paired and unpaired spectrum is possible as both time-division and frequency-division duplex is supported by AML-OFDM.

LTE Architecture

The overall architecture is shown in FIG. 1 and a more detailed representation of the E-UTRAN architecture is given in FIG. 2. The E-UTRAN consists of base stations (referred to as Node Bs or eNode Bs in the 3GPP terminology), providing the E-UTRA user plane (PDCP/RLC/MAC/PHY) and control plane (Radio Resource Control—RRC) protocol terminations towards the mobile terminal (referred to as UE in the 3GPP terminology).

The eNode B hosts the Physical (PHY), Medium Access Control (MAC), Radio Link Control (RLC), and Packet Data Control Protocol (PDCP) layers that include the functionality of user-plane header-compression and encryption. It also offers Radio Resource Control (RRC) functionality corresponding to the control plane. It performs many functions including radio resource management, admission control, scheduling, enforcement of negotiated UL QoS, cell information broadcast, ciphering/deciphering of user and control plane data, and compression/decompression of DL/UL user plane packet headers.

The eNode Bs are interconnected with each other by means of the X2 interface. The eNode Bs are also connected by means of the S1 interface to the EPC (Evolved Packet Core), more specifically to the MME (Mobility Management Entity) by means of the S1-MME and to the Serving Gateway (SGW) by means of the S1-U. The S1 interface supports a many-to-many relation between MMEs/Serving Gateways and eNode Bs. The SGW routes and forwards user data packets, while also acting as the mobility anchor for the user plane during inter-eNode B handovers and as the anchor for mobility between LTE and other 3GPP technologies (terminating S4 interface and relaying the traffic between 2G/3G systems and PDN GW). For idle state UEs, the SGW terminates the downlink data path and triggers paging when downlink data arrives for the UE. It manages and stores UE contexts, e.g., parameters of the IP bearer service, network internal routing information. It also performs replication of the user traffic in case of lawful interception.

The MME is the key control-node for the LTE access-network. It is responsible for idle mode UE tracking and paging procedure including retransmissions. It is involved in the bearer activation/deactivation process and is also responsible for choosing the SGW for a UE at the initial attach and at time of intra-LTE handover involving Core Network (CN) node relocation. It is responsible for authenticating the user (by interacting with the HSS).

The Non-Access Stratum (NAS) signaling terminates at the MME and it is also responsible for generation and allocation of temporary identities to UEs. It checks the authorization of the UE to camp on the service provider's Public Land Mobile Network (PLMN) and enforces UE roaming restrictions. The MME is the termination point in the network for ciphering/integrity protection for NAS signaling and handles the security key management. Lawful interception of signaling is also supported by the MME. The MME also provides the control plane function for mobility between LTE and 2G/3G access networks with the S3 interface terminating at the MME from the SGSN. The MME also terminates the S6a interface towards the home HSS for roaming UEs.

OFDM with Frequency-Domain Adaptation

The AML-OFDM-based (AML-OFDM=Adaptive Multi-Layer-Orthogonal Frequency Division Multiplex) downlink has a frequency structure based on a large number of individual sub-carriers with a spacing of 15 kHz. This frequency granularity facilitates to implement dual-mode UTRA/E-UTRA terminals. The ability to reach high bit rates is highly dependent on short delays in the system and a prerequisite for this is short sub-frame duration. Consequently, the LTE sub-frame duration is set as short as 1 ms in order to minimize the radio-interface latency. In order to handle different delay spreads and corresponding cell sizes with a modest overhead the OFDM cyclic prefix length can assume two different values. The shorter 4.7 ms cyclic prefix is enough to handle the delay spread for most unicast scenarios. With the longer cyclic prefix of 16.7 ms very large cells, up to and exceeding 120 km cell radius, with large amounts of time dispersion can be handled. In this case the length is extended by reducing the number of OFDM symbols in a sub-frame.

The basic principle of Orthogonal Frequency Division Multiplexing (OFDM) is to split the frequency band into a number of narrowband channels. Therefore, OFDM allows transmitting data on relatively flat parallel channels (subcarriers) even if the channel of the whole frequency band is frequency selective due to a multipath environment. Since the subcarriers experience different channel states, the capacities of the subcarriers vary and permit a transmission on each subcarrier with a distinct data-rate. Hence, subcarrier-wise (frequency domain) Link Adaptation (LA) by means of Adaptive Modulation and Coding (AMC) increases the radio efficiency by transmitting different data-rates over the subcarriers. OFDMA allows multiple users to transmit simultaneously on the different subcarriers per OFDM symbol. Since the probability that all users experience a deep fade in a particular subcarrier is very low, it can be assured that subcarriers are assigned to the users who see good channel gains on the corresponding sub-carriers. When allocating resources in the downlink to different users in a cell, the scheduler takes information on the channel status experienced by the users for the subcarriers into account. The control information signaled by the users, i.e., CQI, allows the scheduler to exploit the multi-user diversity, thereby increasing the spectral efficiency.

Localized vs. Distributed Mode

Two different resource allocation methods can be distinguished upon when considering a radio access scheme that distribute available frequency spectrum among different users as in OFDMA. The first allocation mode or "localized mode" tries to benefit fully from frequency scheduling gain by allocating the subcarriers on which a specific UE experiences the best radio channel conditions. Since this scheduling mode requires associated signaling (resource allocation signaling, CQI in uplink), this mode would be best suited for non-real time, high data rate oriented services. In the localized resource allocation mode a user is allocated continuous blocks of subcarriers.

The second resource allocation mode or "distributed mode" relies on the frequency diversity effect to achieve transmission robustness by allocating resources that are scattered over time and frequency grid. The fundamental difference with localized mode is that the resource allocation algorithm does not try to allocate the physical resources based on some knowledge on the reception quality at the receiver but select more or less randomly the resource it allocates to a particular UE. This distributed resource allocation method seems to be best suited for real-time services as less associated signaling (no fast CQI, no fast allocation signaling) relative to "localized mode" is required.

The two different resource allocation methods are shown in FIG. 3 and FIG. 4 for an OFDMA based radio access scheme. As can be seen from FIG. 3, which depicts the localized transmission mode, the localized mode is characterized by the transmitted signal having a continuous spectrum that occupies a part of the total available spectrum. Different symbol rates (corresponding to different data rates) of the transmitted signal imply different bandwidths (time/frequency bins) of a localized signal. On the other hand, as can be seen from FIG. 4, the distributed mode is characterized by the transmitted signal having a non-continuous spectrum that is distributed over more or less the entire system bandwidth (time/frequency bins).

Hybrid ARQ Schemes

A common technique for error detection and correction in packet transmission systems over unreliable channels is called hybrid Automatic Repeat request (HARM). Hybrid ARQ is a combination of Forward Error Correction (FEC) and ARQ.

If a FEC encoded packet is transmitted and the receiver fails to decode the packet correctly (errors are usually checked by a CRC (Cyclic Redundancy Check)), the receiver requests a retransmission of the packet. Generally (and throughout this document) the transmission of additional information is called "retransmission (of a packet)", although this retransmission does not necessarily mean a transmission of the same encoded information, but could also mean the transmission of any information belonging to the packet (e.g., additional redundancy information).

Depending on the information (generally code-bits/symbols), of which the transmission is composed, and depending on how the receiver processes the information, the following Hybrid ARQ schemes are defined:

In Type I HARQ schemes, the information of the encoded packet is discarded and a retransmission is requested, if the receiver fails to decode a packet correctly. This implies that all transmissions are decoded separately. Generally, retransmissions contain identical information (code-bits/symbols) to the initial transmission.

In Type II HARQ schemes, a retransmission is requested, if the receiver fails to decode a packet correctly, where the receiver stores the information of the (erroneous received) encoded packet as soft information (soft-bits/symbols). This implies that a soft-buffer is required at the receiver. Retransmissions can be composed out of identical, partly identical or non-identical information (code-bits/symbols) according to the same packet as earlier transmissions. When receiving a retransmission the receiver combines the stored information from the soft-buffer and the currently received information and tries to decode the packet based on the combined information. (The receiver can also try to decode the transmission individually, however generally performance increases when combining transmissions.) The combining of transmissions refers to so-called soft-combining, where multiple received code-bits/symbols are likelihood combined and solely received code-bits/symbols are code combined. Common methods for soft-combining are Maximum Ratio Combining (MRC) of received modulation symbols and log-likelihood-ratio (LLR) combining (LLR combining only works for code-bits).

Type II schemes are more sophisticated than Type I schemes, since the probability for correct reception of a packet increases with receive retransmissions. This increase comes at the cost of a required hybrid ARQ soft-buffer at the receiver. This scheme can be used to perform dynamic link adaptation by controlling the amount of information to be retransmitted. E.g., if the receiver detects that decoding has been "almost" successful, it can request only a small piece of information for the next retransmission (smaller number of code-bits/symbols than in previous transmission) to be transmitted. In this case it might happen that it is even theoretically not possible to decode the packet correctly by only considering this retransmission by itself (non-self-decodable retransmissions).

Type III HARQ schemes may be considered a subset of Type II schemes: In addition to the requirements of a Type II scheme each transmission in a Type III scheme must be self-decodable.

HARQ Protocol Operation for Unicast Data Transmissions

A common technique for error detection and correction in packet transmission systems over unreliable channels is called hybrid Automatic Repeat request (HARQ). Hybrid ARQ is a combination of Forward Error Correction (FEC) and ARQ.

If a FEC encoded packet is transmitted and the receiver fails to decode the packet correctly (errors are usually checked by a CRC (Cyclic Redundancy Check)), the receiver requests a retransmission of the packet.

In LTE there are two levels of retransmissions for providing reliability, namely, HARQ at the MAC layer and outer ARQ at the RLC layer. The outer ARQ is required to handle residual errors that are not corrected by HARQ that is kept simple by the use of a single bit error-feedback mechanism, i.e., ACK/NACK. An N-process stop-and-wait HARQ is employed that has asynchronous retransmissions in the downlink and synchronous retransmissions in the uplink.

Synchronous HARQ means that the retransmissions of HARQ blocks occur at predefined periodic intervals. Hence, no explicit signaling is required to indicate to the receiver the retransmission schedule.

Asynchronous HARQ offers the flexibility of scheduling retransmissions based on air interface conditions. In this case some identification of the HARQ process needs to be signaled in order to allow for a correct combining and protocol operation. In 3GPP LTE systems, HARQ operations with eight processes is used. The HARQ protocol operation for downlink data transmission will be similar or even identical to HSDPA.

In uplink HARQ protocol operation there are two different options on how to schedule a retransmission. Retransmissions are either "scheduled" by a NACK (also referred to as a synchronous non-adaptive retransmission) or are explicitly scheduled by the network by transmitting a PDCCH (also referred to as synchronous adaptive retransmissions). In case of a synchronous non-adaptive retransmission the retransmission will use the same parameters as the previous uplink transmission, i.e., the retransmission will be signaled on the same physical channel resources, respectively uses the same modulation scheme/transport format.

Since synchronous adaptive retransmission are explicitly scheduled via PDCCH, the eNode B has the possibility to change certain parameters for the retransmission. A retransmission could be for example scheduled on a different frequency resource in order to avoid fragmentation in the uplink, or eNode B could change the modulation scheme or alternatively indicate to the user equipment what redundancy version to use for the retransmission. It should be noted that the HARQ feedback (ACK/NACK) and PDCCH signaling occurs at the same timing. Therefore the user equipment only needs to check once whether a synchronous non-adaptive retransmission is triggered (i.e., only a NACK is received) or whether eNode B requests a synchronous adaptive retransmission (i.e., PDCCH is signaled).

L1/L2 Control Signaling

In order to inform the scheduled users about their allocation status, transport format and other data related information (e.g., HARQ) L1/L2 control signaling is transmitted on the downlink along with the data. This control signaling is multiplexed with the downlink data in a sub-frame (assuming that the user allocation can change from sub-frame to sub-frame). Here, it should be noted, that user allocation might also be performed on a TTI (Transmission Time Interval) basis, where the TTI length is a multiple of the sub-frames. The TTI length may be fixed in a service area for all users, may be different for different users, or may even be dynamic for each user. Generally, then the L1/2 control signaling needs only be transmitted once per TTI.

The L1/L2 control signaling is transmitted on the Physical Downlink Control Channel (PDCCH). It should be noted that assignments for uplink data transmissions, uplink (scheduling) grants, are also transmitted on the PDCCH.

Generally, the information sent on the L1/L2 control signaling may be separated into the two categories, Shared Control Information and Dedicated Control information:

Shared Control Information (SCI) Carrying Cat 1 Information

The SCI part of the L1/L2 control signaling contains information related to the resource allocation (indication). The SCI typically contains the following information:

User identity, indicating the user which is allocated.

RB allocation information, indicating the resources (Resource Blocks, RBs) on which a user is allocated. Note, that the number of RBs on which a user is allocated can be dynamic.

Duration of assignment (optional), if an assignment over multiple sub-frames (or TTIs) is possible.

Depending on the setup of other channels and the setup of the Dedicated Control Information (DCI), the SCI may additionally contain information such as ACK/NACK for uplink transmission, uplink scheduling information, information on the DCI (resource, MCS, etc.).

Dedicated Control Information (DCI) Carrying Cat 2/3 Information

The DCI part of the L1/L2 control signaling contains information related to the transmission format (Cat 2) of the data transmitted to a scheduled user indicated by Cat 1. Moreover, in case of application of (hybrid) ARQ it carries HARQ (Cat 3) information. The DCI needs only to be decoded by the user scheduled according to Cat 1.

The DCI typically contains information on:

Cat 2: Modulation scheme, transport-block (payload) size (or coding rate), MIMO related information, etc. (Note, either the transport-block (or payload size) or the code rate can be signaled. In any case these parameters can be calculated from each other by using the modulation scheme information and the resource information (number of allocated RBs)).

Cat 3: HARQ related information, e.g., hybrid ARQ process number, redundancy version, retransmission sequence number.

Details on L1/L2 Control Signaling Information

For downlink data transmissions L1/L2 control signaling is transmitted on a separate physical channel (PDCCH). This L1/L2 control signaling typically contains information on:

The physical resource(s) on which the data is transmitted (e.g., subcarriers or subcarrier blocks in case of OFDM, codes in case of CDMA). This information allows the UE (receiver) to identify the resources on which the data is transmitted.

The transport format, which is used for the transmission. This can be the transport block size of the data (payload size, information bits size), the MCS (Modulation and Coding Scheme) level, the Spectral Efficiency, the code rate, etc. This information (usually together with the resource allocation) allows the user equipment (receiver) to identify the information bit size, the modulation scheme and the code rate in order to start the demodulation, the de-rate-matching and the decoding process. In some cases the modulation scheme may be signaled explicitly.

Hybrid ARQ (HARD) information:

Process number: Allows the user equipment to identify the Hybrid ARQ process on which the data is mapped.

Sequence number or new data indicator: Allows the user equipment to identify if the transmission is a new packet or a retransmitted packet.

Redundancy and/or constellation version: Tells the user equipment, which hybrid ARQ redundancy version is used (required for de-rate-matching) and/or which modulation constellation version is used (required for demodulation).

UE Identity (UE ID): Tells for which user equipment the L1/L2 control signaling is intended for. In typical implementations this information is used to mask the CRC of the L1/L2 control signaling in order to prevent other user equipments to read this information.

To enable an uplink packet data transmission, L1/L2 control signaling is transmitted on the downlink (PDCCH) to tell the user equipment about the transmission details. This L1/L2 control signaling typically contains information on:

The physical resource(s) on which the user equipment should transmit the data (e.g., subcarriers or subcarrier blocks in case of OFDM, codes in case of CDMA).

The transport Format, the UE should use for the transmission. This can be the transport block size of the data (payload size, information bits size), the MCS (Modulation and Coding Scheme) level, the Spectral Efficiency, the code rate, etc. This information (usually together with the resource allocation) allows the user equipment (transmitter) to pick the information bit size, the modulation scheme and the code rate in order to start the modulation, the rate-matching and the encoding process. In some cases the modulation scheme maybe signaled explicitly.

Hybrid ARQ information:

Process number: Tells the user equipment from which Hybrid ARQ process it should pick the data.

Sequence number or new data indicator: Tells the user equipment to transmit a new packet or to retransmit a packet.

Redundancy and/or constellation version: Tells the user equipment, which hybrid ARQ redundancy version to use (required for rate-matching) and/or which modulation constellation version to use (required for modulation).

UE Identity (UE ID): Tells which user equipment should transmit data. In typical implementations this information is used to mask the CRC of the L1/L2 control signaling in order to prevent other user equipments to read this information.

There are several different flavors how to exactly transmit the information pieces mentioned above. Moreover, the L1/L2 control information may also contain additional information or may omit some of the information. E.g.:

HARQ process number may not be needed in case of a synchronous HARQ protocol.

A redundancy and/or constellation version may not be needed if Chase Combining is used (always the same redundancy and/or constellation version) or if the sequence of redundancy and/or constellation versions is predefined.

Power control information may be additionally included in the control signaling.

MIMO related control information, such as, e.g., precoding, may be additionally included in the control signaling.

In case of multi-codeword MIMO transmission transport format and/or HARQ information for multiple code words may be included.

For uplink resource assignments (for the Physical Uplink Shared Channel—PUSCH) signaled on the PDCCH in LTE, the L1/L2 control information does not contain a HARQ process number, since a synchronous HARQ protocol is employed for LTE uplink. The HARQ process to be used for an uplink transmission is given by the timing. Furthermore it should be noted that the redundancy version (RV) information is jointly encoded with the transport format information, i.e., the redundancy version information is embedded in the transport format (TF) field. The TF field respectively MCS field (Modulation and Coding Scheme field) has for example a size of 5 bits, which corresponds to 32 indices. Three TF/MCS table indices are reserved for indicating RVs 1, 2 or 3. The remaining MCS table indices are used to signal the MCS level (transport block size—TBS) implicitly indicating RV0. The TBS/RV signaling for uplink assignments on PDCCH is shown in Table 1 below. An exemplary PDCCH for uplink resource assignments is shown in FIG. 5. The fields FH (Frequency Hopping), Cyclic shift and CQI (Channel Quality Index) are physical layer parameters and of no specific importance for understanding the invention described herein, so that their description is omitted. The size of the CRC field of the PDCCH is 16 bits. For further, more detailed information on the information fields contained in a PDCCH for uplink resource assignments, e.g., DCI format 0, it is referred to section 5.3.3.1 of 3GPP TS 36.212 "Evolved Universal Terrestrial Radio Access (E-UTRA); Multiplexing and channel coding (Release 8)", version 8.3.0, June 2008, available at http://www.3gpp.org and the entire document being incorporated herein by reference. Even though the field providing transport format respectively modulation and coding scheme and redundancy version information is referred to as "modulation and coding scheme and redundancy version" it will be for the further description of the invention only referred to as modulation and coding scheme (MCS) field.

For downlink resource assignments (for the Physical Downlink Shared Channel—PDSCH) signaled on PDCCH in LTE the redundancy version is signaled separately in a two-bit field. Furthermore the modulation order information is jointly encoded with the transport format information, similar to the uplink case there is 5 bit MCS field signaled on PDCCH. Three of the indices are reserved for the signaling of an explicit modulation order, i.e., those indices do not provide any transport format (transport block size) information. The remaining 29 indices signal modulation order and transport block size information as shown in Table 3 below. For further, more detailed information on the PDCCH formats for downlink resource assignment it is again referred to section 5.3.3.1 of 3GPP TS 36.212. For example, section 5.3.3.1.3 describes the DCI format 1A, which is one of the DCI formats for scheduling PDSCH. For downlink assignments the field providing transport block size and modulation order information is referred to as "modulation and coding scheme" field the term that will also be used in the description of this invention.

UL/DL Grant Reception Behavior

Generally the grant reception procedure (i.e., the procedure of receiving a resource assignment) is split between Physical layer and MAC layer. The Physical layer detects an uplink/downlink resource assignment on the PDCCH, extracts and determines certain information from the PDCCH fields and reports this to MAC layer. The MAC layer is responsible for the protocol procedures, i.e., HARQ protocol operation for uplink/downlink transmissions. Also the scheduling procedures for dynamic as well as semi-persistent scheduling are handled within the MAC layer.

When receiving a resource assignment on the PDCCH for uplink respectively downlink, the physical layer needs to determine certain information from received PDCCH fields which are required for the further processing of the assignments in MAC layer. As described in 3GPP TS 36.213, the Physical layer needs to determine the modulation order and transport block size in the PDSCH for a downlink resource assignment. The calculation of modulation order and transport block size is described in section 7.1.7 of 3GPP TS 36.213. Transport block size together with the HARQ process ID and the NDI bit is delivered to the MAC layer, which requires this information for performing the downlink HARQ protocol operation. The information delivered from Physical layer (Layer 1) to MAC (Layer 2) is also referred to as HARQ information.

Similar to the downlink, the Physical layer calculates modulation order and transport block size from received PDCCH containing the uplink resource assignment as described in section 8.6 of 3GPP TS 36.213. The Physical layer reports the calculated transport block size, redundancy version (RV) as well as NDI information of the PDCCH within the HARQ information to the MAC layer.

Semi-Persistent Scheduling (SPS)

In the downlink and uplink, the scheduling eNode B dynamically allocates resources to user equipments at each transmission time interval via the L1/L2 control channel(s) (PDCCH) where the user equipments are addressed via their specific C-RNTIs. As already mentioned before the CRC of a PDCCH is masked with the addressed user equipment's C-RNTI (so-called dynamic PDCCH). Only a user equipment with a matching C-RNTI can decode the PDCCH content correctly, i.e., the CRC check is positive. This kind of PDCCH signaling is also referred to as dynamic (scheduling) grant. A user equipment monitors at each transmission time interval the L1/L2 control channel(s) for a dynamic grant in order to find a possible allocation (downlink and uplink) it is assigned to.

In addition, E-UTRAN can allocate uplink/downlink resources for initial HARQ transmissions persistently. When required, retransmissions are explicitly signaled via the L1/L2 control channel(s). Since retransmissions are scheduled, this kind of operation is referred to as semi-persistent scheduling (SPS), i.e., resources are allocated to the user equipment on a semi-persistent basis (semi-persistent resource allocation). The benefit is that PDCCH resources for initial HARQ transmissions are saved. For details on semi-persistent scheduling, see 3GPP TS 36.300, "Evolved Universal Terrestrial Radio Access (E-UTRA) and Evolved Universal Terrestrial Radio Access Network (E-UTRAN); Overall description; Stage 2 (Release 8)", version 8.5.0, June 2008 or 3GPP TS 36.321 "Evolved Universal Terrestrial Radio Access (E-UTRA); Medium Access Control (MAC) protocol specification (Release 8)", version 8.2.0, June 2008, both available at http://www.3gpp.org and incorporated herein by reference.

One example for a service, which might be scheduled using semi-persistent scheduling is Voice over IP (VoIP). Every 20 ms a VoIP packet is generated at the codec during a talk-spurt. Therefore eNode B could allocated uplink or respectively downlink resource persistently every 20 ms, which could be then used for the transmission of Voice over IP packets. In general, semi-persistent scheduling is beneficial for services with a predictable traffic behavior, i.e., constant bit rate, packet arrival time is periodic.

The user equipment also monitors the PDCCHs in a sub-frame where it has been allocated resources for an initial transmission persistently. A dynamic (scheduling) grant, i.e., PDCCH with a C-RNTI-masked CRC, can override a semi-persistent resource allocation. In case the user equipment finds its C-RNTI on the L1/L2 control channel(s) in the sub-frames where the sub-frame has a semi-persistent resource assigned, this L1/L2 control channel allocation overrides the semi-persistent resource allocation for that transmission time interval and the user equipment does follow the dynamic grant. When sub-frame does not find a dynamic grant it will transmit/receive according to the semi-persistent resource allocation.

The configuration of semi-persistent scheduling is done by RRC signaling. For example the periodicity, i.e., PS_PERIOD, of the persistent allocation is signaled within Radio resource Control (RRC) signaling. The activation of a persistent allocation and also the exact timing as well as the physical resources and transport format parameters are sent via PDCCH signaling. Once semi-persistent scheduling is activated, the user equipment follows the semi-persistent resource allocation according to the activation SPS PDCCH every PS_PERIOD. Essentially the user equipment stores the SPS activation PDCCH content and follows the PDCCH with the signaled periodicity.

In order to distinguish a dynamic PDCCH from a PDCCH, which activates semi-persistent scheduling, i.e., also referred to as SPS activation PDCCH, a separate identity is introduced. Basically, the CRC of a SPS activation PDCCH is masked with this additional identity which is in the following referred to as SPS C-RNTI. The size of the SPS C-RNTI is also 16 bits, same as the normal C-RNTI. Furthermore the SPS C-RNTI is also user equipment-specific, i.e., each user equipment configured for semi-persistent scheduling is allocated a unique SPS C-RNTI.

In case a user equipment detects a semi-persistent resource allocation is activated by a corresponding SPS PDCCH, the user equipment will store the PDCCH content (i.e., the semi-persistent resource assignment) and apply it every semi-persistent scheduling interval, i.e., periodicity signaled via RRC. As already mentioned, a dynamic allocation, i.e., signaled on dynamic PDCCH, is only a "one-time allocation".

Similar to the activation of semi-persistent scheduling, the eNode B also can deactivate semi-persistent scheduling. There are several options how a semi-persistent scheduling de-allocation can be signaled. One option would be to use PDCCH signaling, i.e., SPS PDCCH indicating a zero size resource allocation, another option would be to use MAC control signaling.

Reduction of SPS False Activation

When the user equipment monitors the PDCCH for assignments, there is always a certain probability (false alarm rate), that the user equipment falsely considers a PDCCH destined to itself. Essentially, situations may occur where the CRC check of the PDCCH is correct even though the PDCCH was not intended for this user equipment, i.e., CRC passes even though there is a UE identifier (UE ID) mismatch (unintended user). These so-called "false alarms" might occur, if the two effects of transmission errors caused by the radio channel and UE ID mismatch cancel each other. The probability of a falsely positive decoded PDCCH depends on the CRC length. The longer the CRC length, the lower the probability that a CRC-protected message is erroneously decoded correctly. With the CRC size of 16 bit the false alarm probability would be 1.5e-05. It should be noted that due to the introduction of a separate identity for the discrimination of dynamic PDCCHs (dynamic C-RNTI) and SPS PDCCHs (SPS C-RNTI), false alarms are even more frequent.

On the first glance the probability might appear to be sufficiently low, however the impacts of a falsely positive decoded semi-persistent scheduling PDCCH are quite severe as will be outlined in the following. Since the effects are in particular for uplink persistent allocation critical, the main focus lies on falsely activated uplink semi-persistent resource allocations.

In case the UE falsely detects a SPS UL PDCCH (i.e., an uplink resource assignment for a semi-persistent resource allocation), the content of the PDCCH is some random value. Consequently UE transmits on PUSCH using some random RB location and bandwidth found in the false positive grant, which subjects the eNode B to UL interferences. With 50% probability UE jams more than half the bandwidth of the system since the Resource Allocation field is random. The user equipment is looking for ACK/NACK in the location corresponding to the (false positive) semi-persistent uplink resource allocation. The eNode B is not transmitting any data to the user equipment and the user equipment will decode the "acknowledgment" for its transmission (ACK/NACK) pretty random. When a NACK is received user equipment performs a synchronous non-adaptive retransmission. When ACK is received user equipment is suspended until the next SPS occasion, and the MAC may assume the transport block has been successfully received and decoded at the eNode B.

Essentially as a consequence of a false activation of a semi-persistent resource allocation for the uplink, a talk spurt can be lost completely or partially several times during a normal voice call. In addition, a false activation of a semi-persistent resource allocation for the uplink causes unnecessary interference to the system.

Given the severe consequences it is desirable to significantly increase the average time of false semi-persistent scheduling activations. One means to lower the false alarm rate to an acceptable level is to use a "Virtual CRC" in order to expand the 16-bit CRC: The length of the CRC field can be virtually extended by setting fixed and known values to some of the PDCCH fields that are not useful for semi-persistent scheduling activation. The user equipment shall ignore the PDCCH for semi-persistent resource activation if the values in these fields are not correct. Since MIMO operation with semi-persistent scheduling does not seem to be that useful, the corresponding PDCCH fields could be used in order to the increase the virtual CRC length. One further example is the NDI field. As already mentioned the NDI bit should be set to 0 on a PDCCH for semi-persistent scheduling activation. The false alarm rate could be further reduced by restricting the set of transport block sizes, which are valid for a semi-persistent scheduling activation.

As mentioned above, a semi-persistent scheduling resource release is signaled by means of an PDCCH similar to an SPS activation. In order to use the resource for SPS efficiently, it is desirable that resources can be re-allocated quickly, for example in VoIP by means of explicit release of a persistent allocation during silence periods in speech, followed by a re-activation when the silence periods end. Therefore it should be noted that at a semi-persistent scheduling resource release an SPS RRC configuration, e.g., PS_PERIOD, remains in place until changed by RRC signaling. Therefore PDCCH is used for an efficient explicit release (de-activation) of semi-persistent scheduling.

One possibility would be sending a semi-persistent scheduling activation with a zero-size resource allocation. A zero-size allocation would correspond to a resource allocation of 0 physical resource blocks (RB) which would effectively deactivate the semi-persistent resource allocation. This solution requires that a PDCCH message, i.e., uplink/downlink resource assignment, is able to indicate "ORBs" as one possible resource block allocation. Since this is not possible with the PDCCH formats agreed on in the 3GPP, a new "ORB" entry would need to be introduced in resource block assignment field for PDSCH and PUSCH. This would however also have impact on the Physical layer-to-MAC Layer interaction in the user equipments, as the Physical layer would further need to be adapted to inform the MAC layer on the deactivation of the semi-persistent resource allocation.

SUMMARY

One object of the invention is to provide a mechanism for deactivating a semi-persistent resource allocation in a LTE system that is not requiring any changes to the Physical layer-to-MAC layer interface and/or preferably no changes to the PDCCH formats agreed by the 3GPP.

The object is solved by the subject matter of the independent claims. Advantageous embodiments of the invention are subject matters of the dependent claims.

One aspect of the invention is to use (existing) physical control channel signaling related to a semi-persistent resource allocation for deactivating the semi-persistent resource allocation to a user equipment (or in other words releasing the grant for the semi-persistent resource allocation) by defining a special control channel signaling content as a deactivation command for the semi-persistent resource allocation. More specifically, the control channel signaling contains a New Data Indicator (NDI) and a modulation and coding scheme field, and a specific combination of the New Data Indicator value and a modulation and coding scheme index signalled within the modulation and coding scheme field is defined to indicate the deactivation of the semi-persistent resource allocation.

According to a second alternative aspect of the invention, the semi-persistent resource allocation is configured by RRC signaling. The RRC signaling is indicating a special transport block size to the user equipment that, when indicated in a resource assignment for the semi-persistent resource allocation on a physical control channel, is commanding the user equipment to deactivate the semi-persistent resource allocation.

Both aspects of the invention do not impact the user equipments operation concerning the handling of resource assignments (grants) and do therefore also not impact the interface between Physical layer and MAC layer as presently defined by the 3GPP.

The invention according to one embodiment is related to a method for deactivating a semi-persistent resource allocation in an LTE-based mobile communication system. The user equipment (a mobile terminal in the 3GPP terminology) is receiving control signalling that is including a New Data Indicator and a modulation and coding scheme field. The control signalling is received via a control channel (such as the PDCCH) from an eNode B (a base station in an LTE system). If the New Data Indicator and the modulation and coding scheme field of the control signalling indicate a predetermined combination of a New Data Indicator value and a modulation and coding scheme index, the user equipment is deactivating the semi-persistent resource allocation.

Another embodiment of the invention is directed to the operation of the eNode B. The eNode B generates for the user equipment control signalling comprising a New Data Indicator and a modulation and coding scheme field. The New Data Indicator and the modulation and coding scheme field include a predetermined combination of a New Data Indicator value and a modulation and coding scheme index that is to cause the user equipment to deactivate the semi-persistent resource allocation. The eNode B transmits the control signalling via a control channel to the user equipment to thereby cause the user equipment to deactivate the semi-persistent resource allocation.

According to a further embodiment of the invention, the predetermined combination of the New Data Indicator value and the modulation and coding scheme index is the New Data Indicator value being 0 (indicating an activation of semi-persistent scheduling) and the modulation and coding scheme index indicating no transport block size Information. Hence, in this exemplary embodiment of the invention, indices of the modulation and coding scheme field are reused that are commonly not used for a resource assignment to activate or reactivate the semi-persistent resource allocation.

In an alternative embodiment of the invention, the predetermined combination of the New Data Indicator value and the modulation and coding scheme index is the New Data Indicator value being 1 (indicating a retransmission of a data packet) and the modulation and coding scheme index indicating a transport block size to the user equipment that is different from the transport block size of the initial transmission of the data. In this exemplary embodiment, the different transport block size for the retransmission is considered a release command for the grant of the semi-persistent resource allocation so that the semi-persistent resource allocation is deactivated.

In a further embodiment, the control signalling is protected by a CRC field that is masked with an RNTI assigned to the user equipment for identification in signalling procedures related to the semi-persistent resource allocation. This feature is not only protecting the content of the control signalling but also allows addressing the control signalling to the desired user equipment and its relation to semi-persistent scheduling, as described previously herein.

According to another embodiment of the invention, at least one field of the control signalling from the eNode B is set to a predetermined value, for validating said control signalling as a semi-persistent resource deactivation indication. This allows to lower the false alarm rate as will be explained below in further detail.

In another embodiment, the concept of the invention is employed to handle semi-persistent resource allocations for uplink and downlink. The modulation and coding scheme field indicates one of plural modulation and coding scheme indices. Further it is assumed that there is a subset of at least three indices that indicate no transport block size information. The user equipment is deactivating a semi-persistent resource allocation for the uplink, in case a first predetermined modulation and coding scheme index of said subset is indicated in the modulation and coding scheme field, a semi-persistent resource allocation for the downlink, in case a second predetermined modulation and coding scheme index of said subset is indicated in the modulation and coding scheme field, and a semi-persistent resource allocation for the downlink and a semi-persistent resource allocation for the uplink, in case a third predetermined modulation and coding scheme index of said subset is indicated in the modulation and coding scheme field.

In a different embodiment of the invention said control signalling is downlink control signalling from the eNode B used for scheduling of downlink transmissions. Said control signalling includes the first predetermined modulation and coding scheme index for deactivating the semi-persistent resource allocation for the uplink. By using the downlink scheduling related control signalling for indicating the uplink semi-persistent resource release, it is possible to reuse mechanisms applied to only the downlink scheduling related control signalling for uplink purposes.

According to a further embodiment of the invention, the reception of the control signalling is acknowledged by the user equipment by transmitting an ACK message to the eNode B. It is possible to acknowledge the reception of control signalling, whereas the prior art only foresees the acknowledgment of transport blocks. This increases the reliability of the semi-persistent resource release indication. Furthermore, the acknowledgment is applicable to the downlink scheduling related control signalling, thus allowing the acknowledgment for downlink scheduling related control signalling as well for the uplink indication of semi-persistent resource release.

The method according to another embodiment of the invention further comprises signalling from the eNode B to the user equipment an RRC message that indicates a periodicity of the semi-persistent resource allocation and a range of allowable transport block sizes that can be configured by a control channel signalled from the eNode B to the user equipment. In a variation of this embodiment, the RRC message further indicates HARQ information on the HARQ process used for downlink transmissions to the user equipment according to the semi-persistent resource allocation.

Another embodiment of the invention is related to an alternative method for deactivating a semi-persistent resource allocation of a user equipment in an LTE-based mobile communication system according to the second aspect of the invention. In this method the user equipment receives a RRC message configuring the semi-persistent resource allocation and indicating a transport block size that when indicated in control signalling related to the semi-persistent resource allocation is causing the user equipment to deactivate the semi-persistent resource allocation. Moreover, the user equipment is receiving control signalling related to the semi-persistent resource allocation from an eNode B. The control signalling is yielding a transport block size for the semi-persistent resource allocation. The user equipment deactivates the semi-persistent resource allocation, if the transport block size indicated in the control signalling matches the transport block size indicated in the RRC message.

In a variation of this embodiment the control signalling is comprising a resource allocation field value that is indicating the number of resource blocks allocated to the user equipment and a modulation and coding scheme index that is indicating a modulation and coding scheme, the user equipment is further determining the transport block size yielded by the control signalling based on the resource allocation field value and the modulation and coding scheme index.

In another embodiment of the invention, the operation of an eNode B in accordance with the above-mentioned alternative method for deactivating a semi-persistent resource allocation of a user equipment in an LTE-based mobile communication system is considered. The eNode B transmits a RRC message to the user equipment for configuring the semi-persistent resource allocation. This RRC message is indicating a transport block size that when yielded by control signalling related to the semi-persistent resource allocation is causing the user equipment to deactivate the semi-persistent resource allocation. Furthermore, the eNode B generates control signalling related to the semi-persistent resource allocation and yielding the transport block size indicated by said RRC message, and transmits the control signalling to the user equipment to thereby cause the user equipment to deactivate the semi-persistent resource allocation.

In a further embodiment of the invention, the RRC message indicates the periodicity of the semi-persistent resource allocation and a range of allowable transport block sizes that can be used for the activation of semi-persistent scheduling. In a variation, the RRC message could additionally indicate HARQ information on the HARQ process used for downlink transmissions according to the semi-persistent resource allocation to the user equipment.

According to another embodiment of the invention, for uplink semi-persistent scheduling, the modulation and coding scheme field is indicating one of plural predetermined indices. Thereby, a non-empty subset of the predetermined indices is used to jointly encode modulation scheme, transport block size and redundancy version for an uplink data transmission, while the remaining indices are used to encode only a redundancy version for an uplink data transmission.

Alternatively, for downlink semi-persistent scheduling, the modulation and coding scheme field is indicating one of plural predetermined indices, wherein a non-empty subset of the predetermined indices is used to jointly encode modulation scheme and transport block size for a downlink transmission to be received by the user equipment, while the remaining indices are used to encode only a modulation scheme for a downlink transmission.

In an exemplary embodiment of the invention, the control channel is a PDCCH and/or the control signalling is comprised of a resource assignment to the user equipment.

Furthermore, the invention is also related to the apparatuses and computer readable media for performing the method for deactivating a semi-persistent resource allocation according to the various embodiments and aspects of the invention described herein. In this connection, another embodiment of the invention is providing a user equipment for use in an LTE-based mobile communication system that is comprising a receiver for receiving via a control channel from an eNode B control signalling that is including a New Data Indicator and a modulation and coding scheme field, and a processing unit for deactivating the semi-persistent resource allocation, if the New Data Indicator and the modulation and coding scheme field of the control signalling signal a predetermined combination of a New Data Indicator value and a modulation and coding scheme index.

The invention according to a further embodiment is related to an eNode B for use in an LTE-based mobile communication system that is comprising a scheduler for generating for the user equipment control signalling comprising a New Data Indicator and a modulation and coding scheme field including a predetermined combination of a New Data Indicator value and a modulation and coding scheme index that is causing the user equipment to deactivate the semi-persistent resource allocation, and a transmitter for transmitting said control signalling via a control channel to the user equipment to thereby cause the user equipment to deactivate the semi-persistent resource allocation.

Likewise, the invention according to another embodiment is also related to a computer readable medium storing instructions that when executed by a processor of a user equipment cause the user equipment to deactivate a semi-persistent resource allocation in an LTE-based mobile communication system, by receiving via a control channel from an eNode B control signalling that is including a New Data Indicator and a modulation and coding scheme field, and deactivating the semi-persistent resource allocation, if the New Data Indicator and the modulation and coding scheme field of the control signalling signal a predetermined combination of a New Data Indicator value and a modulation and coding scheme index.

Another embodiment of the invention is providing a computer readable medium storing instructions that when executed by a processor of an eNode B, cause the eNode B to deactivate a semi-persistent resource allocation of a user equipment by generating for the user equipment control signalling comprising a New Data Indicator and a modulation and coding scheme field including a predetermined combination of a New Data Indicator value and a modulation and coding scheme index that is causing the user equipment to deactivate the semi-persistent resource allocation, and transmitting said control signalling via a control channel to the user equipment to thereby cause the user equipment to deactivate the semi-persistent resource allocation.

A further embodiment of the invention is related to the second aspect of the invention and a user equipment for use in an LTE-based mobile communication system, comprising a receiver for receiving a RRC message configuring a semi-persistent resource allocation and indicating a transport block size that when indicated in control signalling related to the semi-persistent resource allocation is causing the user equipment to deactivate the semi-persistent resource allocation. The receiver of the user equipment is adapted to receive control signalling related to the semi-persistent resource allocation from an eNode B, wherein the control signalling is yielding a transport block size for the semi-persistent resource allocation. Furthermore, the user equipment comprises a processing unit for deactivating the semi-persistent resource allocation, if the transport block size indicated in the control signalling matches the transport block size indicated in the RRC message.

In a variation, the control signalling is comprising a resource allocation field value that is indicating the number of resource blocks allocated to the user equipment and a modulation and coding scheme index that is indicating a modulation and coding scheme, and the user equipment's processing unit is further adapted to determine said transport block size yielded by the control signalling based on the resource allocation field value and the modulation and coding scheme index.

Another embodiment of the invention is related to an eNode B for use in an LTE-based mobile communication system, comprising a transmitter for transmitting a RRC message to a user equipment for configuring a semi-persistent resource allocation, wherein the RRC message is indicating a transport block size that when yielded by control signalling related to the semi-persistent resource allocation is causing the user equipment to deactivate the semi-persistent resource allocation, a scheduler for generating control signalling related to the semi-persistent resource allocation and yielding the transport block size indicated by said RRC message, and a transmitter for transmitting the control signalling to the user equipment to thereby cause the user equipment to deactivate the semi-persistent resource allocation.

In a further embodiment, the invention is providing a computer readable medium storing instructions that when executed by a processor of a user equipment cause the user equipment to deactivate a semi-persistent resource allocation in an LTE-based mobile communication system, by receiving a RRC message configuring the semi-persistent resource allocation and indicating a transport block size that when indicated in control signalling related to the semi-persistent resource allocation is causing the user equipment to deactivate the semi-persistent resource allocation, receiving control signalling related to the semi-persistent resource allocation from an eNode B, wherein the control signalling is yielding a transport block size for the semi-persistent resource allocation, and deactivating the semi-persistent resource allocation, if the transport block size indicated in the control signalling matches the transport block size indicated in the RRC message.

In a variation of this embodiment, the control signalling is comprising a resource allocation field value that is indicating the number of resource blocks allocated to the user equipment and a modulation and coding scheme index that is indicating a modulation and coding scheme, and the computer readable medium is further storing instructions that when executed by the processor of the user equipment cause same to determine the transport block size yielded by the control signalling based on the resource allocation field value and the modulation and coding scheme index.

Another embodiment is related to a computer readable medium storing instructions that when executed by a processor of an eNode B, cause the eNode B to deactivate a semi-persistent resource allocation of a user equipment by transmitting a RRC message to the user equipment for configuring the semi-persistent resource allocation, wherein the RRC message is indicating a transport block size that when yielded by control signalling related to the semi-persistent resource allocation is causing the user equipment to deactivate the semi-persistent resource allocation, generating control signalling related to the semi-persistent resource allocation and yielding the transport block size indicated by said RRC message, and transmitting the control signalling to the user equipment to thereby cause the user equipment to deactivate the semi-persistent resource allocation.

BRIEF DESCRIPTION OF THE FIGURES

In the following, the invention is described in more detail in reference to the attached figures and drawings. Similar or corresponding details in the figures are marked with the same reference numerals.

FIG. 3 shows an exemplary allocation of radio resources of an OFDM channel in localized transmission mode, FIG. 4 shows an exemplary allocation of radio resources of an OFDM channel in distributed transmission mode, FIG. 5 shows an exemplary format of a resource assignment message (PDCCH) for allocating uplink resources to a mobile terminal.

DETAILED DESCRIPTION OF EXAMPLE EMBODIMENTS

Figure 1:
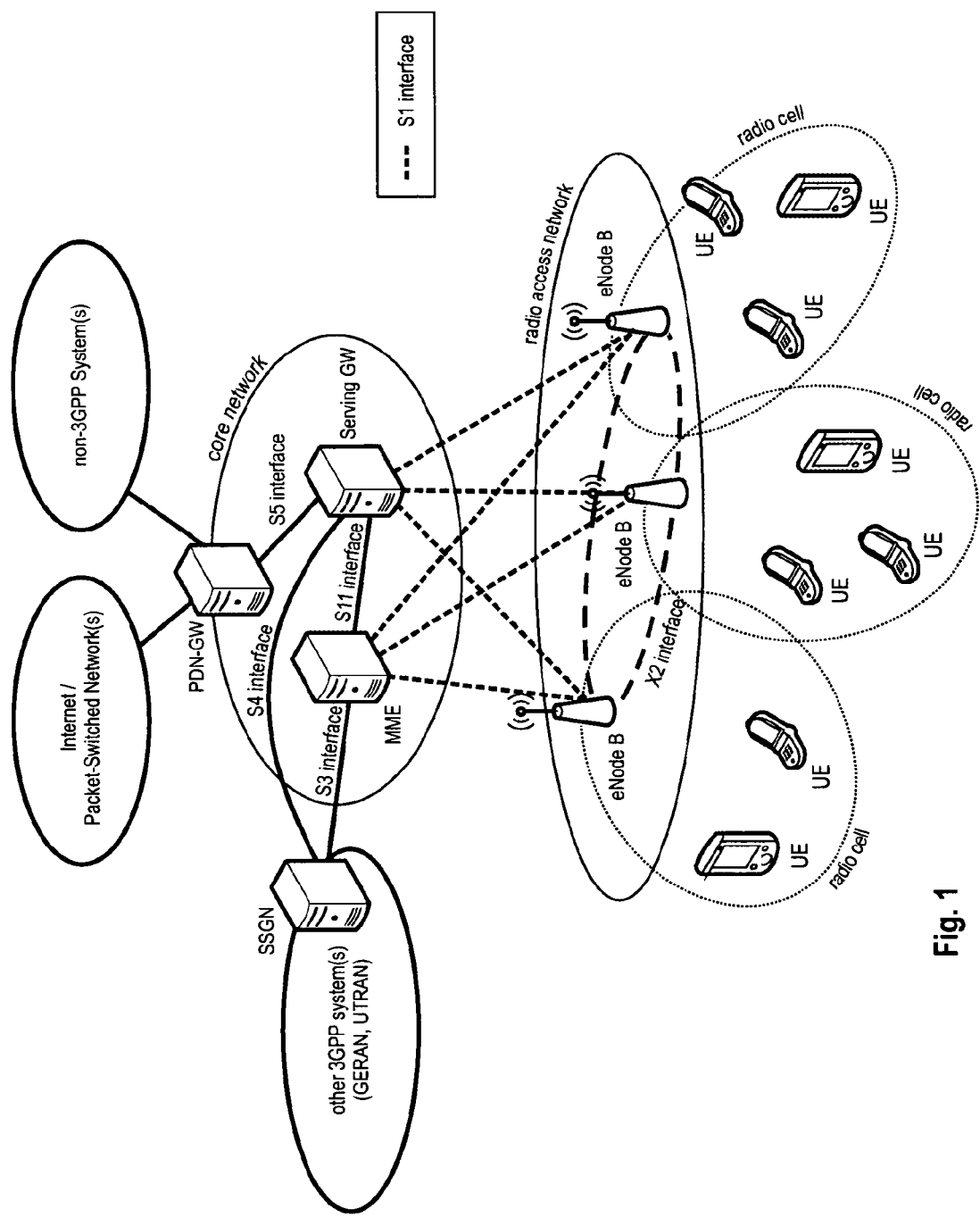
FIG. 1 shows an exemplary high level architecture of a 3GPP LTE system.

The following paragraphs will describe various embodiments of the invention. For exemplary purposes only, most of the embodiments are outlined in relation to an (evolved) communication system according to LTE discussed in the Technical Background section above.

One aspect of the invention is to use (existing) physical control channel signaling related to a semi-persistent scheduling for deactivating the semi-persistent resource allocation to a user equipment (or in other words releasing the grant for the semi-persistent resource allocation) by defining a special combination of control channel signaling values as a deactivation command for the semi-persistent resource allocation. More specifically, the physical control channel signaling may be a resource assignment related to the semi-persistent resource allocation that is commonly used to allocate or reallocate radio resources to the user equipment for the semi-persistent resource allocation. The control signaling, respectively the resource assignment information is assumed to contain a New Data Indicator and a modulation and coding scheme field. A special combination of the New Data Indicator value and a modulation and coding scheme index, which is signalled within the modulation and coding scheme field, is defined to indicate the deactivation of the semi-persistent resource allocation (or in other words releases a previous resource assignment (grant) for the semi-persistent resource allocation).

According to one embodiment of the invention, a semi-persistent resource allocation in an LTE-based mobile communication system is deactivated by the eNode B generating special control signalling information (e.g., a resource assignment) for the user equipment that is containing a predetermined combination of a New Data Indicator value and a modulation and coding scheme index that is to cause the user equipment to deactivate the semi-persistent resource allocation. The eNode B signals this control signalling information to the user equipment, which is receiving the control signalling information and processes it. If the user equipment detects the control signalling information to contain a predetermined combination of a New Data Indicator value and a modulation and coding scheme index, the user equipment is deactivating the semi-persistent resource allocation.

There are different possibilities how to define the predetermined combination (or combinations) of a New Data Indicator value and a modulation and coding scheme index that are to release the grant for a semi-persistent resource allocation—which can be also referred to as a resource release command. In one example, the modulation and coding scheme index in the resource assignment is indicating no transport block size while the New Data Indicator is indicating an activation of semi-persistent scheduling i.e., is set to 0. As no initial data transmission can be sent/received properly without having knowledge of the transport block size, a modulation and coding scheme index indicating no transport block size is typically unused for a resource assignment or reassignment in connection with semi-persistent scheduling and can therefore be used as a resource release command.

Another possibility to communicate a resource release command for a semi-persistent resource allocation is to indicate a change in the transport block size for a retransmission of a semi-persistently scheduled data packet, which is especially applicable to scenarios where HARQ in combination with soft-combining is used. In order to allow soft combining of different transmissions of a data packet, their transport block size needs to be constant throughout the transmission of the data packet (i.e., for the initial transmission and all retransmissions). If a change in the transport block size is signalled for a retransmission (i.e., the resource allocation in terms of the number of resource blocks allocated for the transmission and the modulation and coding scheme index is resulting in another transport block size), the user equipment could interpret this combination of the New Data Indicator value being 1 and the changing transport block size to instruct a deactivation of the semi-persistent resource allocation.

The two alternative implementations described above may however have one drawback: The resource release command is not allocating any resources to the user equipment so that it can only be used to release the grant for the semi-persistent resource allocation. An alternative solution and aspect of the invention which would overcome such potential drawback is to adapt the RRC signaling procedure for configuring the semi-persistent resource allocation. In this alternative solution, the RRC signaling is indicating a special transport block size to the user equipment that, when indicated in a resource assignment for the semi-persistent resource allocation is commanding the user equipment to deactivate the semi-persistent resource allocation.

Hence, when signaling a resource assignment indicating this specifically designated transport block size (i.e., the number of resource blocks allocated for the transmission according to the resource allocation field of the resource assignment and the modulation and coding scheme index thereof is resulting in the specially designated transport block size), the user equipment may still use the resource assignment for transmission/reception and will further deactivate the semi-persistent resource allocation for future transmissions/receptions. However, a potential drawback of this solution in comparison to using a special combination of the New Data Indicator value and modulation and coding scheme index may be that this solution would require changes to the RRC control signalling specification.

Nevertheless, both solutions discussed above do not impact the user equipment's operation concerning the handling of resource assignments (grants) and do therefore also not impact the interface between Physical layer and MAC layer as presently defined by the 3GPP.

Figure 6:
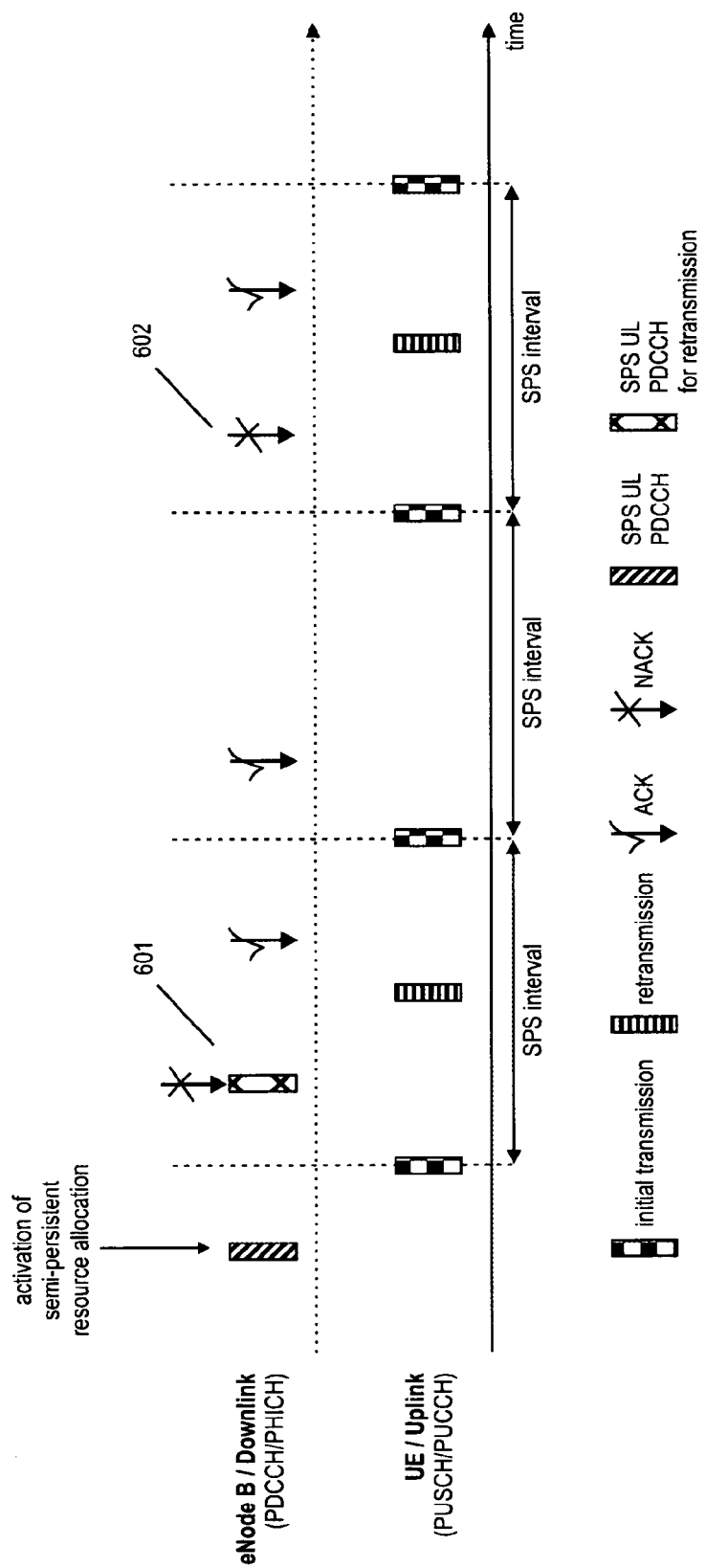
FIG. 6 shows an exemplary signaling procedure for activating an uplink semi-persistent resource allocation between a user equipment (UE) and an eNode B according to an exemplary embodiment of the invention.

Next the different aspects of the invention will be outlined in further detail below under reference to a LTE-based mobile communication system using semi-persistent scheduling as outlined in the Technical Background section. FIG. 6 shows an exemplary signaling procedure for activating an uplink semi-persistent resource allocation between a user equipment (UE) and an eNode B according to an exemplary embodiment of the invention. As indicated above, semi-persistent scheduling is configured using RRC signalling between a user equipment and an eNode B (not shown in FIG. 6). More specifically, the configuration of the semi-persistent resource allocation via RRC signalling configures the periodicity (SPS interval in FIG. 6) of the semi-persistent resource allocation, i.e., the periodic time instances the user equipment is to receive data on the physical downlink shared channel (PDSCH) or transmit data on the physical uplink shared channel (PUSCH). By convention, the transmission occurring to/from the user equipment at the indicated periodic time instances are initial transmissions of data. Retransmission for semi-persistently scheduled initial transmissions are either indicated by a PDCCH, i.e., explicitly scheduled or—for the uplink case—could be also triggered by a NACK in order to request a non-adaptive retransmission.

Furthermore it should be noted that a PDCCH scheduling a SPS retransmission, the CRC of the PDCCH is also masked with the SPS C-RNTI. The distinction between (re)activation of semi-persistent scheduling and SPS retransmissions is done based on the NDI. For example a NDI bit value set to 0 indicates an activation of semi-persistent allocation, whereas a NDI bit value set to 1 indicates a retransmission.

The actual activation of semi-persistent scheduling is realized by sending a PDCCH including a resource allocation to the user equipment in which the NDI value is set to 0 (SPS PDCCH). The NDI bit value set to 0 in connection with the resource allocation related to semi-persistent scheduling activates (or reactivates, i.e., overwrites the grant of a previous activation) the semi-persistent scheduling—given that a valid transport block size is signalled by the SPS PDCCH. The resource allocation is protected by a CRC field masked with an RNTI specifically assigned to the user equipment for control signalling procedures related to the semi-persistent scheduling of uplink or downlink resources, such as the SPS C-RNTI of the user equipment. In case the CRC field of a PDCCH (respectively, the content of the PDCCH) is being masked with the SPS C-RNTI of the user equipment this means that the PDCCH control information is for semi-persistent scheduling of this user equipment.

The PDCCH including the resource allocation is granting physical channel resources to the user equipment, same will periodically use for transmissions/reception of data via PUSCH/PDSCH that is scheduled on a semi-persistent basis. Accordingly, the user equipment stores the content of the resource allocation on the PDCCH (and updates thereof). As mentioned above, the eNode B may or may not send a dynamic grant for retransmission of a semi-persistently scheduled initial transmission of data. If a dynamic grant for the SPS retransmission is sent 601, the user equipment obeys same, otherwise, if no dynamic grant is sent 602 the user equipment uses the already granted physical resources used for the previous transmission of the packet for the retransmission, i.e., non-adaptive retransmission.

Figure 7:
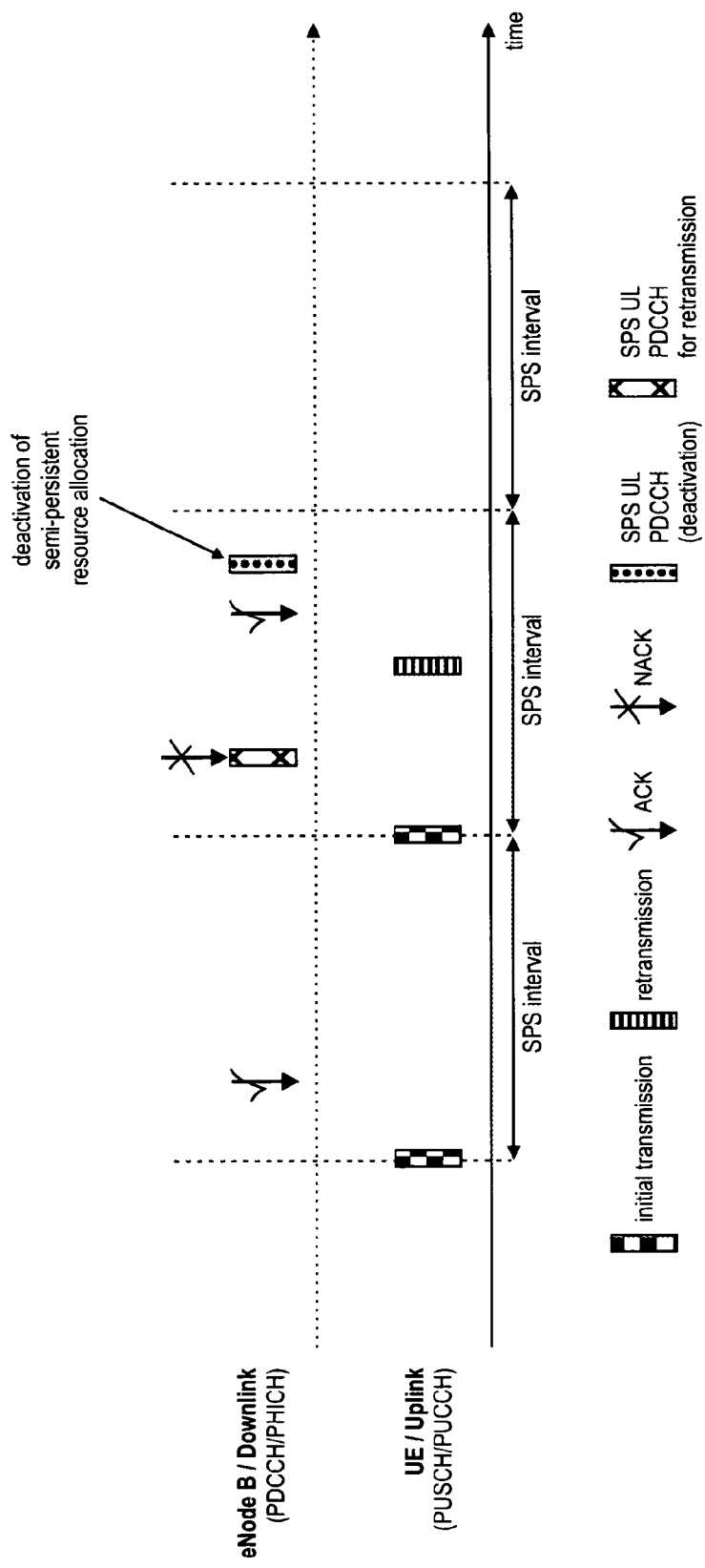
FIGS. 7 and 8 show different exemplary signaling procedure for deactivating an uplink semi-persistent resource allocation between a user equipment (UE) and an eNode B according to exemplary embodiments of the invention.

FIG. 7 shows an exemplary signaling procedure for deactivating an uplink semi-persistent resource allocation between a user equipment and an eNode B according to an exemplary embodiment of the invention. For exemplary purposes it is assumed that a uplink semi-persistent resource allocation has been configured before, for example as shown in FIG. 6. In this exemplary embodiment of the invention, it is assumed that the eNode B sends a PDCCH for the semi-persistent resource allocation of the user equipment, here a SPS UL PDCCH (deactivation), that is containing a special combination of NDI bit value and the modulation and coding scheme index comprised therein—see FIG. 5. In this exemplary embodiment, in order to signal an explicit release of uplink SPS resources, the eNode B sends a PDCCH for semi-persistent scheduling (re)activation (SPS UL PDCCH (deactivation)) which does not provide any transport block size information. This will be interpreted by the user equipment as a command to release the semi-persistent scheduling resources, i.e., to deactivate the semi-persistent scheduling (e.g., until the next activation is received). Furthermore, it should be noted that the PDCCH for deactivating the semi-persistent resource allocation can be sent at any time instant, e.g., in response to the eNode B detecting a no-speech period in VoIP communication transmitted using semi-persistent scheduling.

In a more specific exemplary embodiment of the invention, it is assumed that the modulation and coding scheme field (MCS index) is defined as in 3GPP TS 36.213, section 8.61 (see Table 8.6.1-1) for the uplink, shown in Table 1 below:

TABLE 1

| MCS Index $I_{MCS}$ | Modulation Order $Q'_m$ | TBS Index $I_{TBS}$ | Redundancy Version $rv_{idx}$ |
| --- | --- | --- | --- |
| 0 | 2 | 0 | 0 |
| 1 | 2 | 1 | 0 |
| 2 | 2 | 2 | 0 |
| 3 | 2 | 3 | 0 |
| 4 | 2 | 4 | 0 |
| 5 | 2 | 5 | 0 |
| 6 | 2 | 6 | 0 |
| 7 | 2 | 7 | 0 |
| 8 | 2 | 8 | 0 |
| 9 | 2 | 9 | 0 |
| 10 | 2 | 10 | 0 |
| 11 | 4 | 10 | 0 |
| 12 | 4 | 11 | 0 |
| 13 | 4 | 12 | 0 |
| 14 | 4 | 13 | 0 |
| 15 | 4 | 14 | 0 |
| 16 | 4 | 15 | 0 |
| 17 | 4 | 16 | 0 |
| 18 | 4 | 17 | 0 |
| 19 | 4 | 18 | 0 |
| 20 | 4 | 19 | 0 |
| 21 | 6 | 19 | 0 |
| 22 | 6 | 20 | 0 |
| 23 | 6 | 21 | 0 |
| 24 | 6 | 22 | 0 |
| 25 | 6 | 23 | 0 |
| 26 | 6 | 24 | 0 |
| 27 | 6 | 25 | 0 |
| 28 | 6 | 26 | 0 |
| 29 | reserved | | 1 |
| 30 | | | 2 |
| 31 | | | 3 |

For the uplink, a PDCCH indicating a modulation and coding scheme index (IMcs) between 29 and 31 is indicating no transport block size information (TBS Index) and is commonly not used for (re)activation of semi-persistent scheduling. According to this exemplary embodiment, for signaling an explicit SPS resource release command, the eNode B signals an uplink resource assignment the CRC of which is masked with SPS C-RNTI (SPS UL PDCCH) with the NDI bit set to 0, in order to indicate activation of semi-persistent scheduling, and a modulation and coding scheme index equal to 29, 30 or 31. According to this embodiment, one (or more) of modulation and coding scheme indices 29 to 31 is interpreted by the user equipment to deactivate the uplink semi-persistent resource allocation (i.e., to release the currently valid SPS grant) in case of an uplink PDCCH addressed with SPS C-RNTI and NDI bit set to 0 is received. This is exemplarily illustrated in the modified excerpt of Table 1 below:

TABLE 2

| MCS Index $I_{MCS}$ | Modulation Order $Q'_m$ | TBS Index $I_{TBS}$ | Redundancy Version $rv_{idx}$ |
| --- | --- | --- | --- |
| 0 | 2 | 0 | 0 |
| ... | ... | ... | ... |
| 26 | 6 | 24 | 0 |
| 27 | 6 | 25 | 0 |
| 28 | 6 | 26 | 0 |
| 29 | UL PDCCH with SPS C-RNTI and NDI = 0: UL SPS release UL PDCCH with C-RNTI: reserved | | 1 |

TABLE 2-continued

| MCS Index $I_{MCS}$ | Modulation Order $Q'_m$ | TBS Index $I_{TBS}$ | Redundancy Version $rv_{idx}$ |
| --- | --- | --- | --- |
| 30 | reserved | | 2 |
| 31 | | | 3 |

In case semi-persistent scheduling has not been activated before, the user equipment ignores the received SPS UL PDCCH.

The user equipment can distinguish between an SPS deactivation for a downlink semi-persistent resource allocation and an uplink semi-persistent resource allocation based on the DCI format of the PDCCH. For example, the DCI format 0 as specified in 3GPP TS 36.213 is used in order to signal an uplink SPS resource release, whereas DCI format 1 or 1A as specified in 3GPP TS 36.213 is used for a downlink SPS resource release.

In this connection it should be also noted that the definition of the modulation and coding scheme field for downlink transmissions is slightly differing from the definition for the uplink as shown in Table 1 above. For downlink transmissions, the indices of the modulation and coding scheme field are defined as shown in section 7.1.7.1 of 3GPP TS 36.213 (see Table 7.1.7.1-1) which is shown below:

TABLE 3

| MCS Index $I_{MCS}$ | Modulation Order $Q_m$ | TBS Index $I_{TBS}$ |
| --- | --- | --- |
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 6 | 15 |
| 18 | 6 | 16 |
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |
| 29 | 2 | reserved |
| 30 | 4 | |
| 31 | 6 | |

Similar to the example for UL PDCCHs, the user equipment is interpreting one (or more) of the modulation and coding scheme indices 29 to 31 as a deactivation command for the downlink semi-persistent resource allocation (i.e., to release the currently valid SPS grant) in case of a DL PDCCH addressed with SPS C-RNTI and NDI bit set to 0 is received.

Accordingly, in a further exemplary embodiment the definitions of Table 3 above are redefined as follows:

TABLE 4

| MCS Index $I_{MCS}$ | Modulation Order $Q_m$ | TBS Index $I_{TBS}$ |
|---|---|---|
| 0 | 2 | 0 |
| ... | ... | ... |
| 26 | 6 | 24 |
| 27 | 6 | 25 |
| 28 | 6 | 26 |
| 29 | 2 | DL PDCCH with SPS C-RNTI and NDI = 0: DL SPS release DL PDCCH with C-RNTI: reserved |
| 30 | 4 | reserved |
| 31 | 6 | |

In a further embodiment of the invention, the three MCS indices 29, 30 and 31 shown in Tables 1 and 3 above are reused to identify whether the uplink, downlink, or uplink and downlink resources of the semi-persistent resource allocation should be released. Accordingly, one possible definition of the meaning of the modulation and coding scheme indices 29 to 31 in an uplink and/or downlink SPS PDCCH with the NDI bit set to 0 could be defined as follows:

TABLE 5

| MCS Index $I_{MCS}$ | Command |
|---|---|
| 29 | PDCCH with SPS C-RNTI and NDI = 0: Release UL SPS only |
| 30 | PDCCH with SPS C-RNTI and NDI = 0: Release DL SPS only |
| 31 | PDCCH with SPS C-RNTI and NDI = 0 Release UL & DL SPS |

One benefit of this exemplary embodiment may be seen in that only one DCI format of the PDCCH needs to be used for the SPS deactivation signaling for the downlink as well as for the uplink direction, in comparison to the embodiments discussed with respect to Tables 1 to 4 above, where the user equipment distinguished uplink and downlink SPS deactivation based on the PDCCH's DCI format.

For example, the smallest DCI format, i.e., smallest PDCCH payload size, could be used for the SPS release indication, which would improve the radio efficiency. Alternatively the DCI format allowing the most possible "virtual CRC" bits can be used in order to reduce the false release probability.

Generally, since the CRC field of a PDCCH indicating a release of SPS resource is masked with the SPS C-RNTI of the addressed user equipment and the NDI bit of the PDCCH is set to zero, a PDCCH indicating a SPS release can be seen as a special SPS activation PDCCH. As already mentioned, the activation of SPS is indicated by a PDCCH addressed to the UE's SPS C-RNTI with the NDI bit set to zero. Basically, an "SPS release" PDCCH can be understood as an "SPS activation" PDCCH with the MCS field set to some reserved predetermined MCS indice(s), e.g., MCS indices 29 to 31. Expressed in another way, a SPS release indication can be seen as an SPS activation indication providing no Transport block size information.

Therefore, the embodiments of the invention may be advantageously combined with several techniques aiming at reducing the false SPS activation rate that are currently under discussion within 3GPP for the SPS activation (see the Technical Background section above). One means to lower the false alarm rate to an acceptable level is to extend to CRC length virtually by setting fixed and known values/indices to some of the PDCCH fields that are not useful for semi-persistent scheduling.

Generally, the virtual CRC extension that can be applied to an SPS activation PDCCH is also applicable to the SPS resource release PDCCH so as to lower the false alarm rate of a UE falsely considering a PDCCH to be destined to itself. In more detail, the length of the 16-bit CRC field of the PDCCH indicating a release of SPS resources can be virtually extended by setting fixed and known values to some of the PDCCH fields that are not useful for semi-persistent scheduling activation respectively release. For instance, for a UL PDCCH indicating the release of DL SPS resource the TPC field can be set to "00" and/or the cyclic shift DM RS field can be set to "000", for a DL PDCCH indicating the release of DL SPS resources the HARQ process ID field can be set to "000" and the RV field can be set to "00". Similarly the Resource allocation field within a PDCCH indicating a release of SPS resources can be set to a fixed predetermined value.

The UE can verify a received PDCCH with the CRC masked by the Semi-Persistent C-RNTI, and when the new data indicator field is set to zero, as a valid SPS release indication by checking that these fields which are used for the virtual CRC extension are set to the correct values. Only if the UE verified the received downlink control information on the PDCCH as a valid semi-persistent release indication, the UE releases the configured SPS resources. Thereby, the probability of a falsely received PDCCH indicating SPS release can be lowered in the same way as for the SPS activation. Hence the average time of false semi-persistent scheduling releases can be significantly increased.

It should be noted that the term DL PDCCH is used here to indicate a PDCCH with a DCI format used for PDSCH scheduling like for example DCI format 1 or 1A or 2. In the same way, the term UL PDCCH should be understood as a PDCCH with a DCI format used for scheduling PUSCH, like for example DCI format 0.

Next, the operation of Physical Layer and MAC Layer upon reception of a SPS PDCCH according to different embodiments of the invention will be described in further detail. Please note that in the following a distinction between an uplink SPS resource release and a downlink SPS resource release is made only where appropriate. Generally, the explanations are equally applicable to the processing of SPS UL PDCCH and SPS DL PDCCH, unless indicated otherwise. Furthermore, the description of FIG. 9 and FIG. 10 below assume for exemplary purposes only that the PDCCH comprises a resource assignment as shown in FIG. 5.

Figure 9:
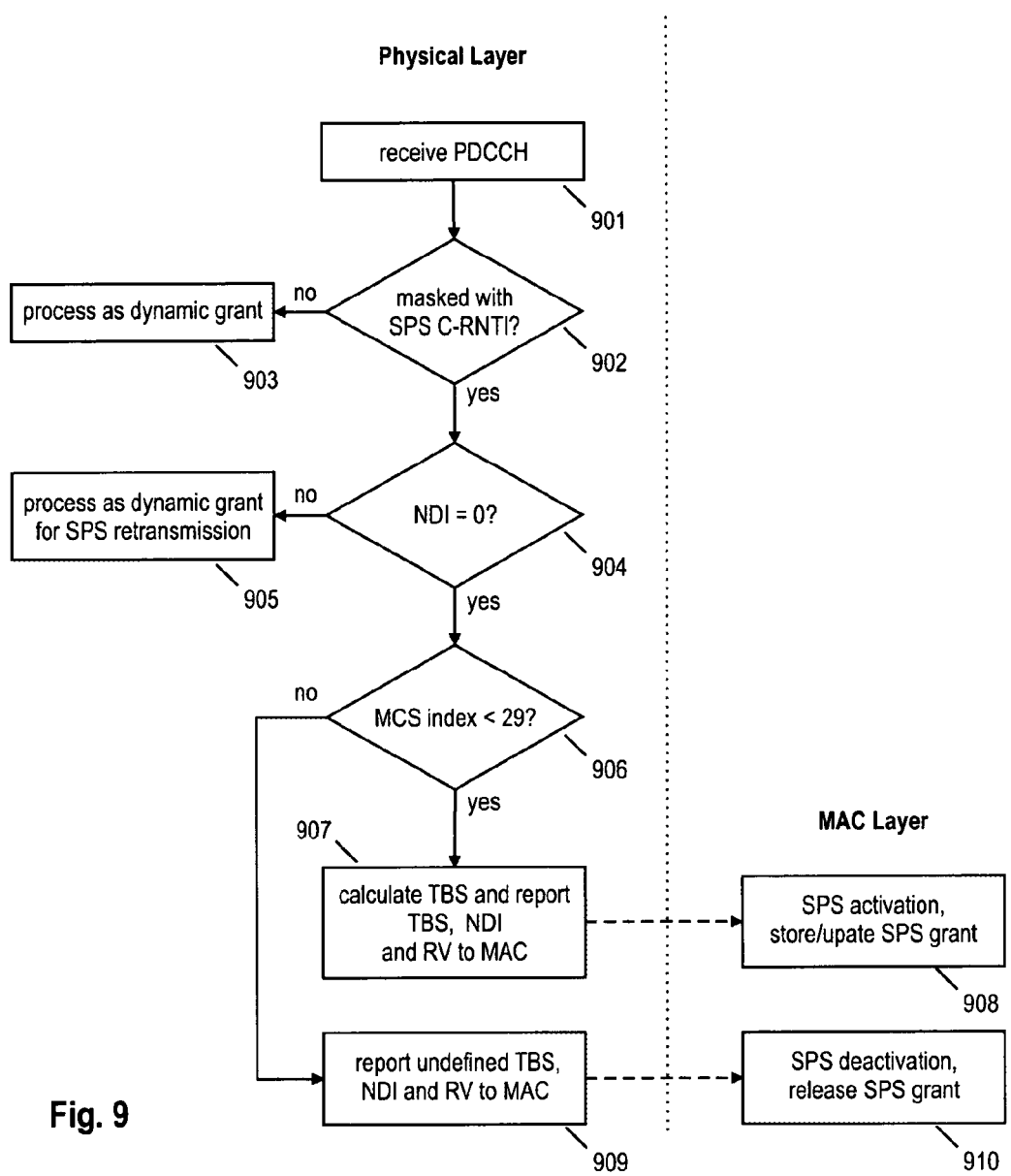
FIGS. 9 and 10 show flow charts of the basic operation of the Physical layer entity and the MAC-layer entity of a user equipment according to exemplary embodiments of the invention to realize a deactivation of semi-persistent scheduling.

FIG. 9 shows an exemplary handling of a received PDCCH at the Physical Layer and the MAC Layer of a user equipment. In this context, it should be noted that the flow chart of FIG. 9 is only illustrating the most important steps in view of the concept of the invention. Obviously, as will be partly explained in more detail below, further steps may be performed as required to properly process a PDCCH at the user equipment.

The user equipment first receives 901 a PDCCH and checks 902 whether or not the PDCCH is comprising a CRC field masked with an SPS C-RNTI of the user equipment. If not, i.e., the PDCCH's CRC is masked with a C-RNTI, the user equipment processes 903 the PDCCH as a dynamic grant for scheduled transmissions/receptions. In case the PDCCH is addressed to the user equipment with its SPS C-RNTI, the Physical layer entity of the user equipment is checking 904 the NDI bit value. If the NDI bit value is equal to 1, the SPS PDCCH is for a retransmission of semi-persistently scheduled data and is processed 905 accordingly.

If the NDI bit is equal to 0, i.e., the PDCCH is an SPS (re)activation, the Physical layer entity of the user equipment further processes other PDCCH fields like the modulation and coding scheme field (MCS field).

In this exemplary embodiment, if a modulation and coding scheme index of 29 or higher is signaled and the SPS PDCCH is for uplink semi-persistent scheduling, the redundancy version (RV) is for example set to 1 for modulation and coding scheme index 29 (see Tables 1 and 2 above) and the transport block size is set to "undefined", i.e., no indication of transport block size.

Consequently the Physical layer entity of the user equipment reports 909 a received UL PDCCH addressed to the SPS C-RNTI with NDI bit equals 0, RV=1 and transport block size="undefined" to the MAC layer entity of the user equipment. The MAC layer entity is generally responsible for the scheduling and thus also handles SPS related operations. In case the reception of an UL PDCCH addressed with SPS C-RNTI, NDI=0, RV=1 and TB size="undefined" is reported from the Physical layer entity, the MAC layer entity detects 910 the uplink SPS resource release based on the missing transport size information for an SPS activation PDCCH. Accordingly, the user equipment deletes the stored grant for the semi-persistent resource allocation and stops transmitting (respectively receiving) data according to the semi-persistent resource allocation.

In case the Physical layer entity is detecting a modulation and coding scheme index smaller than 29 being signaled in the SPS PDCCH, the Physical layer determines the signaled transport block size from the modulation and coding scheme index and the number of allocated resource blocks in the resource assignment (RA) field, and provides 907 an indication on the reception of an SPS PDCCH together with the determined transport block size, NDI=0, and the signaled redundancy version to the MAC layer entity of the user equipment, which stores the information provided by the Physical layer entity and (re)activates the semi-persistent resource allocation.

The procedure for a downlink SPS resource release can be implemented in a similar manner. However in this case a SPS DL PDCCH with modulation and coding scheme index of 29 would indicate an explicit modulation order (see Tables 3 and 4 above) instead of an RV like for the uplink. Also for the downlink case, the transport block size would be "undefined" for a modulation and coding scheme index of 29 or higher, which would be reported to MAC layer entity in a similar fashion as explained above. The MAC layer entity detects an SPS resource release for a downlink semi-persistent resource allocation based on the missing transport block size information delivered from Physical layer entity for the received SPS DL PDCCH.

It should be noted that the exemplary embodiments discussed with respect to FIG. 9 above assume that a modulation and coding scheme index of 29 being sent in a SPS UL/DL PDCCH with a NDI bit value set to 0 is triggering the deactivation of the semi-persistent resource allocation. It is to be noted that also the modulation and coding scheme index of 30 or 31 could be used instead, or as shown in Table 5, each of the with modulation and coding scheme indices 29, 30 and 31 could trigger a respective deactivation of an uplink, downlink or uplink and downlink semi-persistent resource allocation.

Figure 10:
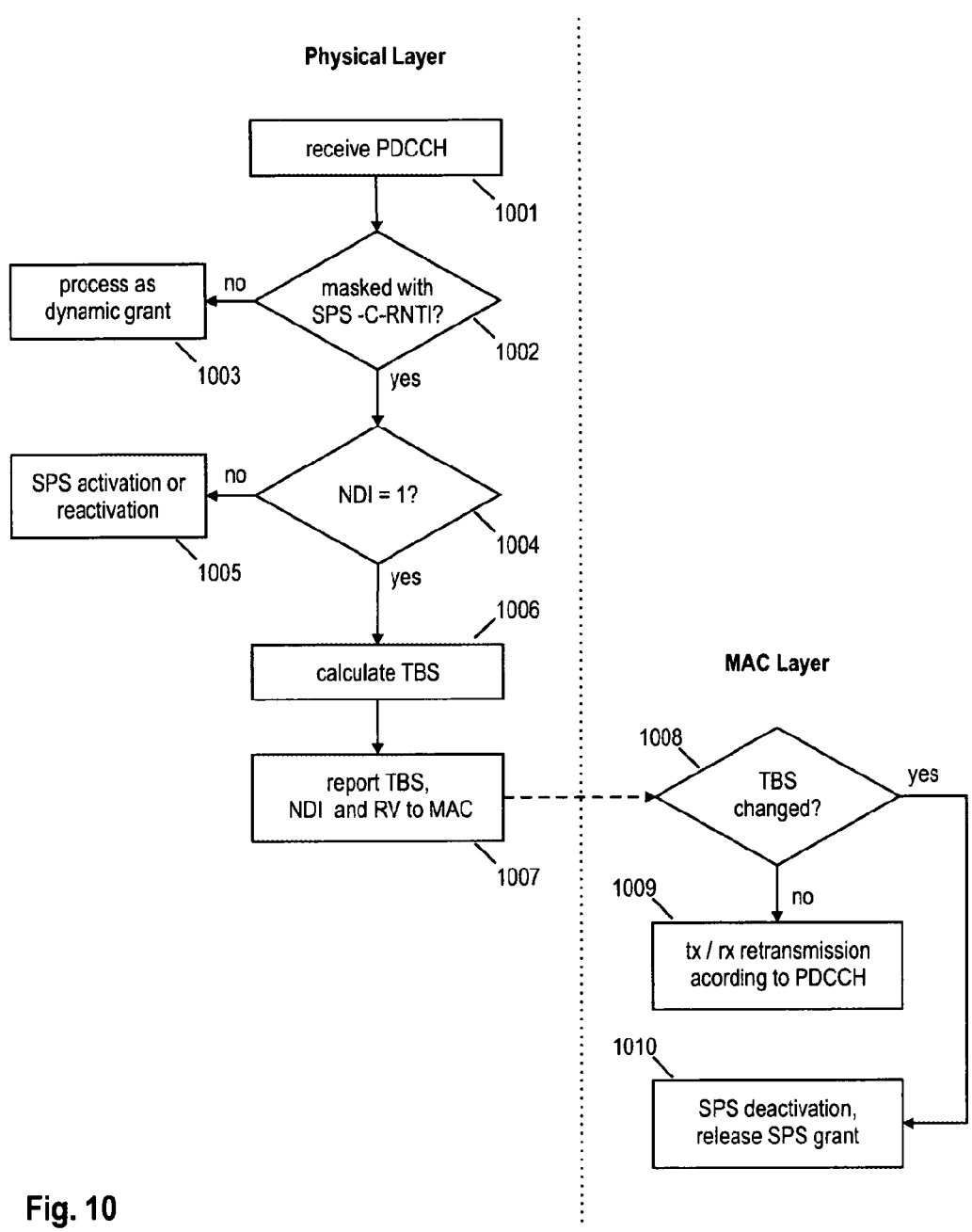

Another alternative exemplary handling of a received PDCCH at the Physical Layer and the MAC Layer of a user equipment is shown in the flow chart of FIG. 10. In the embodiments discussed so far SPS release signaling has assumed that a SPS activation PDCCH is used where the NDI bit value is set 0. In this exemplary embodiment a PDCCH assigning a SPS retransmission, i.e., the NDI bit value is set to 1, indicates an explicit release of SPS resources. For retransmissions the transport block size needs to be constant for the all transmissions of a data packet, i.e., its initial transmission and all retransmissions, if a HARQ protocol using soft combining is used—otherwise no soft combining would be possible. The case where the transport block size signaled within a PDCCH for a SPS retransmission differs from the transport block size used for the initial transmission could be interpreted as an SPS resource release. In the dynamic scheduling case the scenario where transport block size of retransmission is different from the initial transport block size, is typically a HARQ protocol error. However for the semi-persistent scheduling case this could be also used as a SPS resource release trigger.

Also with respect to FIG. 10, it should be noted that the flow chart is illustrating only the most relevant steps of this exemplary method. Obviously, as will be partly explained in more detail below, further steps may be performed as required to properly process a PDCCH at the user equipment.

Similar to FIG. 9, the user equipment first receives 1001 a PDCCH and subsequently checks 1002 whether or not the PDCCH is related to semi-persistent scheduling by checking whether the CRC field has been masked with an SPS C-RNTI of the user equipment. If the PDCCH's CRC is not masked with a user equipment's SPS C-RNTI, the user equipment processes 1003 the PDCCH as a dynamic grant for scheduled transmissions/receptions.

In case the PDCCH is addressed to the user equipment by means of using an SPS C-RNTI, the Physical layer entity of the user equipment is checking 1004 the NDI bit value. If the NDI bit is equal to 0, the SPS PDCCH is handled 1005 as a SPS activation or reactivation as in the state of the art.

If the NDI bit value is 1, i.e., indicating the PDCCH being related to a retransmission for a semi-persistent resource allocation, the Physical layer entity of the user equipment calculates 1006 the transport block size signaled in the PDCCH from the modulation and coding scheme index and the number of allocated resource blocks comprised in the resource assignment (RA) field of the PDCCH. Further, the Physical layer entity reports 1007 the calculated transport block size (TBS), the NDI and the redundancy version (RV) indicated in the PDCCH to the MAC layer entity.

The user equipment's MAC layer entity recognizes the PDCCH information to indicate a retransmission of semi-persistently scheduled data and checks 1008 whether or not the transport block size signaled in the PDCCH has changed in comparison to the transport block size signaled for the initial semi-persistently scheduled transmissions. If the transport block size is unchanged the user equipment is transmitting/receiving 1009 the retransmission according to the grant of the PDCCH. If the transport block size signaled in the PDCCH received in step 1001 has changed, the MAC layer entity is interpreting 1010 the PDCCH as a SPS resource release. Accordingly, the MAC layer entity releases the related SPS grant for the semi-persistent resource allocation and is deactivating the transmission of semi-persistently scheduled data.

Generally, it should be noted that upon uplink SPS deactivation, the user equipment is not transmitting any data (This is commonly referred to a user equipment making a Discontinued Transmission (DTX)). Upon receiving a downlink SPS deactivation, there are several alternatives how the user equipment could react. For example, the user equipment could not decode the PDSCH in response to a received PDCCH indicating a DL SPS resource release (downlink data is sent on the PDSCH within the same TTI as the corresponding PDCCH) and would consequently transmit no ACK or NACK in the uplink, i.e., DTX of HARQ feedback, or could alternatively acknowledge the reception of the PDCCH by sending an acknowledgement (ACK) for the PDCCH to the eNode B.

In particular, in prior art systems like the current specified LTE-based mobile communication system the transmission of HARQ ACKs and NACKs on the uplink is only foreseen for transport blocks of the shared channel PDSCH corresponding to the PDCCH. The PDCCH itself cannot be acknowledged with an ACK or NACK message. Therefore, the DL SPS release message encoded into the DL PDCCH cannot be acknowledged in the prior art. It should be noted that the term DL PDCCH is used here, to indicate a PDCCH with a DCI format used for PDSCH scheduling like for example DCI format 1 or 1A or 2. In the same way, the term UL PDCCH should be understood as a PDCCH with a DCI format used for scheduling PUSCH, like for example DCI format 0.

However, according to an embodiment of the invention, a DL PDCCH indicating a release of DL SPS resources is acknowledged by the UE by means of sending an HARQ ACK in response thereto to the eNode B (eNB). The possibility of acknowledging a DL PDCCH increases the reliability of the SPS release mechanism, since it is possible for the eNB to determine whether the UE has correctly received the SPS release instruction. In case that the eNB detects no HARQ ACK in response to having sent a SPS release indication, the eNB could repeat the DL PDCCH indicating the release of DL SPS resources.

As already mentioned, in prior art systems the HARQ receiver which resides in the UE for the downlink direction acknowledges or does not acknowledge the correct reception, respectively correct decoding, of a transport block received on the DL-SCH by sending an HARQ ACK/NACK to the HARQ transmitting entity for the uplink direction which resides in the eNB. The HARQ ACK/NACK is for example transmitted on an uplink physical control channel (PUCCH) or could be also multiplexed with higher layer data on the UL shared channel (UL-SCH).

Further details on the determination of the uplink resource for HARQ ACK/NACK can be found in section 10.1 of 3GPP TS36.213 version 8.4.0.

The uplink resources for the HARQ ACK/NACK transmission are generally implicitly assigned by the DL PDCCH indicating the corresponding scheduled downlink shared channel transmission. As already outlined, when receiving a DL PDCCH indicating the release of DL SPS resources there is no corresponding DL-SCH transmission, i.e., no transport block is transmitted together with a DL PDCCH indicating a release of DL SPS resources. The DL PDCCH is only commanding the release of the semi-persistent scheduling resources but does not grant a physical channel resource for receiving a transport block on the DL-SCH. Nonetheless, the UE could use the uplink resources assigned for the HARQ ACK/NACK for a received transport block on the DL-SCH in order to confirm/acknowledge the reception of a DL PDCCH indicating a release by means of an HARQ ACK. Also the timing of the HARQ ACK confirming the reception of the DL PDCCH indicating a release of SPS resources could be the same as for a received transport block on DL-SCH.

The above embodiment applies for the downlink SPS release via the DL PDCCH. For the uplink, in case the UL SPS release is transmitted via a UL PDCCH, it is not possible to confirm the reception of the UL PDCCH indicating a release of uplink SPS resources by an HARQ ACK in the same way as for the downlink case in order to achieve the same reliability for the SPS release procedure. More specifically, for the case of UL assignments there are no resources available for an HARQ ACK/NACK sent by the UE on the uplink, since for the uplink direction the HARQ ACK/NACK is sent by the eNB in the downlink. In detail, when the UE receives an UL assignment indicated by a PDCCH, a transport block is transmitted in response thereto on the UL-SCH to the corresponding eNB, that in turn acknowledges the reception/decoding of the transport block from the UE by an HARQ ACK/NACK. Thus, the acknowledgment of the UL PDCCH would require a completely new and complex UE behavior, which would hinder the acknowledgment of any UL SPS release mechanism.

Another embodiment of the invention allows the use of a DL PDCCH for releasing also UL SPS resources, thus enabling the acknowledgment of the reception of the PDCCH indicating a release of UL SPS resources by acknowledging the DL PDCCH. In more detail, the embodiment explained with reference to Table 5 introduced the possibility to use the multiple MCS indices, e.g., 29, 30 and 31 in order to identify whether the uplink, downlink or uplink and downlink SPS resources should be released. One benefit is that only one DCI format for the PDCCH needs to be used to indicate the release of SPS resources for downlink as well as for uplink direction, compared to other embodiments (referring to description for Tables 1 to 4), where the UE distinguishes uplink and downlink SPS deactivation/release based on the PDCCH's DCI format.

In one exemplary embodiment the release of DL SPS resources is indicated by a PDCCH scheduling a PDSCH transmission having the CRC masked with the SPS C-RNTI, the NDI bit set to zero and the modulation and coding scheme index equal to 31 or respectively '11111' in binary notation. The release of uplink SPS resources is similarly indicated by a PDCCH scheduling a PDSCH transmission having the CRC masked with the SPS C-RNTI, the NDI bit set to zero and the modulation and coding scheme index equal to 30 or respectively '11110' in binary notation.

Consequently, the DCI format could be for example 1, 1A or 2 when using the DL PDCCH for releasing the DL SPS resources. In addition, when using DCI format 1 or 1A, the DL PDCCH may further contain another MCS Index for indicating the UL SPS resource release, e.g., MCS Index 29 in Table 5. As a result, the UL SPS resource release indication can also be acknowledged by the UE through an HARQ ACK sent in response to the received DL PDCCH indicating release of UL SPS resources, and thus the same high reliability can be achieved for UL as for DL SPS deactivation.

Using the DCI format 1A in order to indicate UL as well as DL SPS resource release would have the advantages, that a DCI format 1A can be decoded by each UE which is configured by higher layers to decode PDCCHs with the CRC masked by the SPS C-RNTI. Furthermore, the DCI format 1A is monitored by the mobile in the common search space as well as in the UE-specific search irrespective of the downlink transmission mode. Another advantage would be that the DCI format 1A denotes the DCI format with the smallest payload which is used for semi-persistent scheduling related control signalling. Details on the UE procedure related to monitoring of PDCCH for control information can be found in section 9.1.1 of TS36.213 version 8.4.0.

One potential advantage of the embodiments discussed above, in particular with respect to FIGS. 7, 9 and 10, is that no changes to existing PDCCH fields as specified for LTE are required and further, no adaption of the Physical layer-to-MAC layer interface in the user equipments is required. Another potential advantage is that no changes to the grant reception procedure in the user equipment are necessary. The Physical layer entity of the user equipment can receive an UL/DL PDCCH and reports the received resource assignment on the PDCCH together with the corresponding HARQ information to the MAC layer entity. The user equipment's MAC layer entity can perform the necessary operations for dynamically scheduled respectively semi-persistently scheduled transmissions, i.e., HARQ operations, based on the received information from the Physical layer entity.

In contrast, the solution discussed in the Technical Background section of introducing a SPS resource allocation size of zero ("ORBs") to deactivate a semi-persistent resource allocation would for example require that the Physical layer entity detects an SPS resource release based on the "ORBs" indication within the resource allocation field and reports this to MAC layer entity. This in turn requires a new inter-layer signaling between Physical layer entity and MAC layer entity in the user equipment, since in the current LTE standards, the MAC layer entity performs the scheduling operation, i.e., detecting of SPS activation/retransmission/resource release and performing the corresponding actions, as described above.

In the embodiments discussed above with respect to FIGS. 7, 9 and 10, it has been assumed that the modulation and coding scheme index that—in combination with the value of the NDI—is indicating the deactivation of the semi-persistent resource allocation is an index that is indicating no transport block size, i.e., which is not suitable for the activation or reactivation of semi-persistent scheduling. However it should be noted that it is not necessarily required to use only one of the modulation and coding scheme indices for deactivating the semi-persistent scheduling, that does not provide a transport block size information, such as indices 29, 30 and 31 shown in Tables 1 to 5 above. It is generally possible to reserve any arbitrary modulation and coding scheme index out of the modulation and coding scheme indices representable according to the given modulation and coding scheme field size (e.g., 5 bits resulting in 32 indices), in order to indicate a SPS resource release. Obviously the selected modulation and coding scheme index may thus not be used for an SPS activation or reactivation.

The selection of a modulation and coding scheme index indicating a valid transport block size may be nevertheless advantageous in connection with trying to reduce the probability of a false SPS activation by setting fixed and known values to some of the PDCCH fields. According to one exemplary embodiment of the invention only a limited number of modulation and coding scheme indices out of the set of available indices could be allowed for use in a PDCCH that is activating or reactivating semi-persistent scheduling. For example, those "allowed indices" might be those modulation and coding scheme indices the most significant bit of which is 0, so that allowed range of modulation and coding scheme indices that can be used to activate or reactivate a semi-persistent resource allocation is restricted to indices 0 to 15 when exemplarily considering a 5 bit modulation and coding scheme field as exemplified in Tables 1 to 4 above. Any PDCCH that is indicating SPS (re)activation (CRC is masked with SPS C-RNTI and the NDI bit value is set to 0) and further indicating a modulation and coding scheme index outside the allowed range—i.e., the indicated modulation and coding scheme index in the PDCCH is >15—would be ignored by the user equipment's Physical layer entity, i.e., the PDCCH is not reported to the MAC layer entity and is thus not activating semi-persistent scheduling. According to this embodiment, one of the 16 modulation and coding scheme indices allowed for the activation of semi-persistent scheduling would thus have to be selected to indicate a deactivation of the semi-persistent scheduling. For example it could be defined that the highest modulation and coding scheme index within the allowed range of modulation and coding scheme indices used for a SPS (re)activation, indicates an SPS resource release, e.g., modulation and coding scheme index 15. This would however reduce the number of modulation and coding scheme indices which could be effectively used for an SPS (re)activation.

Another option may be to allow only a subset of possible modulation and coding scheme indices for the activation or reactivation of semi-persistent scheduling as discussed above, but to use one or all other modulation and coding scheme indices invalid for the activation of the semi-persistent scheduling as an explicit SPS resource release indication. For example, if modulation and coding scheme indices 0 to 15 are defined allowable for activating semi-persistent scheduling, the modulation and coding scheme index of 16 could be used to command to the user equipment to release to corresponding SPS resource. When comparing this option to the solution of defining one of the modulation and coding scheme indices valid for SPS activation as a SPS resource release indication, the advantage of this option is that the eNode B has more freedom in choosing among indices can be used for SPS activation.

However, this embodiment and option may require a change to the Physical layer operation of the user equipment and may also require further inter-layer communication between the Physical layer entity and the MAC layer entity in the user equipment depending on the implementation. As the MAC layer entity is only informed on the transport block size signaled in the PDCCH, the MAC layer entity is not informed and may not conclude on the actually signaled modulation and coding scheme index, as different modulation and coding scheme indices may result in the same transport block size depending on the number of resource blocks assigned to the user equipment. Hence, the processing of the PDCCH in the Physical layer entity needs to be adapted to detect that the PDCCH is signaling a SPS deactivation by checking the NDI bit value and the modulation and coding scheme index in the SPS PDCCH.

Accordingly, the Physical layer entity could inform the MAC layer entity on a SPS resource release by indicating an "undefined" transport block size to the MAC layer entity in response to the NDI bit value in the PDCCH being set to 0 and a modulation and coding scheme field includes a (predetermined) index which is for example an invalid modulation and coding scheme index for SPS activation. This possibility would require only a change to the processing of the PDCCH in the Physical layer entity, however no new inter-layer communication between Physical layer and MAC layer is needed. Alternatively, the Physical layer entity could explicitly inform the MAC layer entity on a SPS resource release by introducing a respective inter-layer communication between Physical layer entity and MAC layer entity in the user equipment.

Next, further embodiments of the invention according to the second aspect of the invention will be discussed with respect to FIGS. 8, 11, 12 and 13. In contrast to using a predetermined combination (or combinations) of the NDI bit value and modulation and coding scheme index (indices) to signal a SPS resource release, the following embodiments discussed with respect to FIGS. 8, 11, 12 and 13 use a specially designated transport block size that is indicating an SPS resource release to the user equipment. The embodiments according to this alternative aspect of the invention may be advantageously combined with several techniques aiming at reducing the false SPS activation rate that are currently under discussion within 3GPP (see the Technical Background section above). One means to lower the false alarm rate to an acceptable level is to extend to CRC length virtually by setting fixed and known values/indices to some of the PDCCH fields that are not useful for semi-persistent scheduling. Further, another possibility used in one embodiment of the invention is to restrict the set of transport block sizes, which is allowed for an SPS activation.

In the current LTE specification, semi-persistent scheduling is configured by RRC signaling using a message, which includes semi-persistent scheduling related parameters. This message includes the SPS periodicity (SPS Interval in FIG. 6) and—for downlink semi-persistent scheduling operation—HARQ process information.

According to this exemplary embodiment, the RRC signaling message for configuring the semi-persistent scheduling further includes information on allowed transport block sizes, i.e., transport block sizes that may be used in connection with an SPS activation or reactivation. Every time a PDCCH for SPS activation is received at the MAC layer entity, the MAC layer entity checks whether the indicated transport block size in the PDCCH is within the set of allowed transport block sizes, i.e., is a valid transport block size for SPS activation. Since the transport block size signaled in a PDCCH depends on the number of allocated resource blocks and the modulation and coding scheme, one alternative would be to signal a minimum and maximum allowed transport block size within the SPS configuration message to indicate a range of transport block sizes that can be used for SPS activation or reactivation. All transport block sizes between this minimum and maximum value would thus be valid transport block sizes for an SPS activation or reactivation. It should be noted that there are also further alternative how to restrict the allowed transport block sizes for a semi-persistent scheduling (re)activation, for example by signaling via RRC the corresponding modulation and/or coding scheme indices and resource allocation sizes resulting in valid transport sizes.

Figures 2, 12, 13:
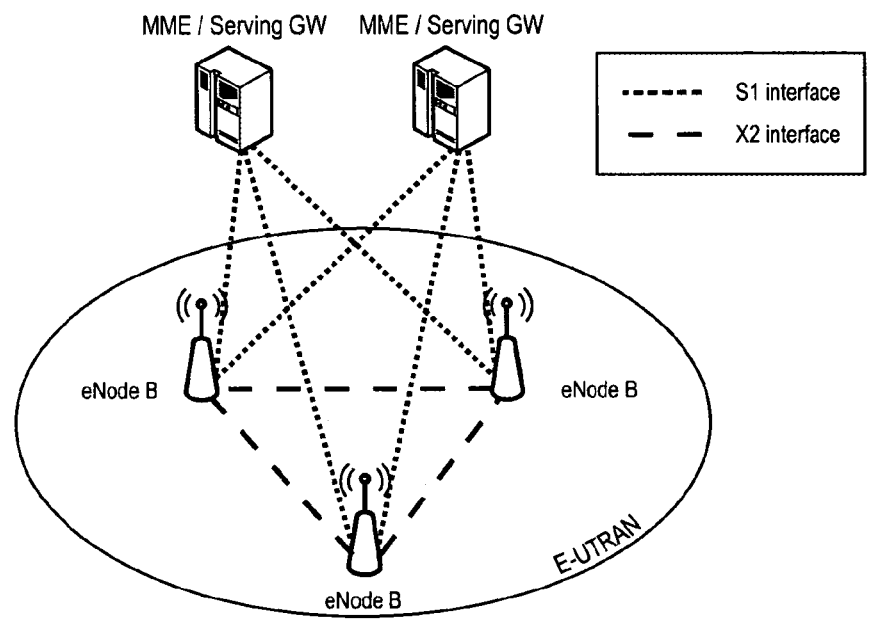
FIG. 2 shows an exemplary overview of the E-UTRAN of the high level architecture of a 3GPP LTE system in FIG. 1.
FIGS. 12 and 13 show exemplary RRC message formats for configuring a semi-persistent scheduling according to exemplary embodiments of the invention.

For the indication of an SPS resource release, the RRC protocol could be further modified to include to the SPS configuration related parameters a predetermined transport block size, which when signaled in a PDCCH is indicating a SPS resource release. This transport block size is referred to as "release TBS" in the following. FIG. 12 exemplarily illustrates a SPS configuration message according to an exemplary embodiment of the invention including a "release TBS" field that is indicating the specified release TBS value.

Figure 8:
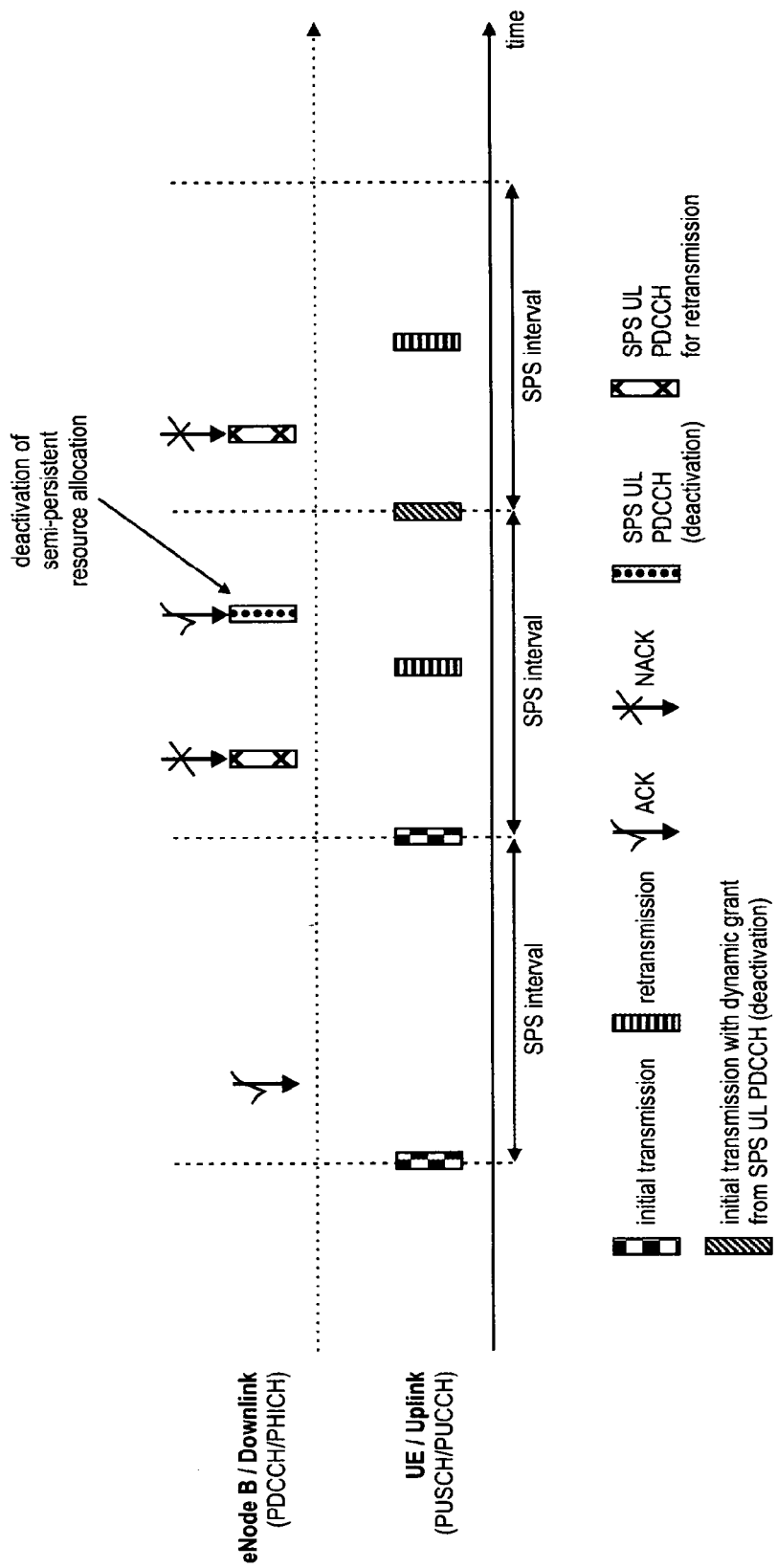

FIG. 8 shows an exemplary signaling procedure for deactivating an uplink semi-persistent resource allocation between a user equipment and an eNode B according to an exemplary embodiment of the invention, where a RRC configured release TBS is used to deactivate a semi-persistent resource allocation to the user equipment. In comparison to the signaling in FIG. 7, it should be noted that the deactivation of semi-persistent scheduling according to the exemplary embodiment in FIG. 8 has the advantage that the PDCCH is not only commanding the deactivation of the semi-persistent scheduling but also grants a physical channel resource for receiving/transmitting a final data packet.

The signaling in FIG. 8 is essentially similar to that shown in FIG. 7. However, the SPS UL PDCCH for deactivating the semi-persistent resource allocation (SPS UL PDCCH (deactivation)) is yielding the release TBS by signaling a corresponding number of allocated resource blocks and modulation and coding scheme index resulting in this transport block size. As indicated above, a further difference to the signaling in FIG. 7 is that the SPS UL PDCCH (deactivation) is not only triggering the deactivation of the semi-persistent resource allocation at the user equipment but is so-to-say also providing at the same time a dynamic grant for one further transmission using the resource allocation and transport format signaled within the SPS UL PDCCH (deactivation) i.e., in this example the uplink semi-persistent scheduling is deactivated upon having received the SPS UL PDCCH (deactivation) and the UE is making one initial data uplink transmission according to the uplink assignment signaled within the SPS UL PDCCH (deactivation) (initial transmission with dynamic grant from SPS UL PDCCH (deactivation)) and corresponding retransmissions, if any).

Although the example in FIG. 8 is related to uplink semi-persistent scheduling, it should be noted that this concept may be equally applied to downlink semi-persistent scheduling. In the latter case the SPS DL PDCCH (deactivation) will indicate a downlink transmission on the resources and with the transport format as indicated in the SPS DL PDCCH (deactivation) and furthermore the deactivation of the downlink semi-persistent scheduling at the user equipment. For example the eNode B could signal a release of semi-persistent scheduling and, at the same time, a RRC message for releasing the bearer using the semi-persistently scheduled resources, i.e., a VoIP bearer.

Figure 11:
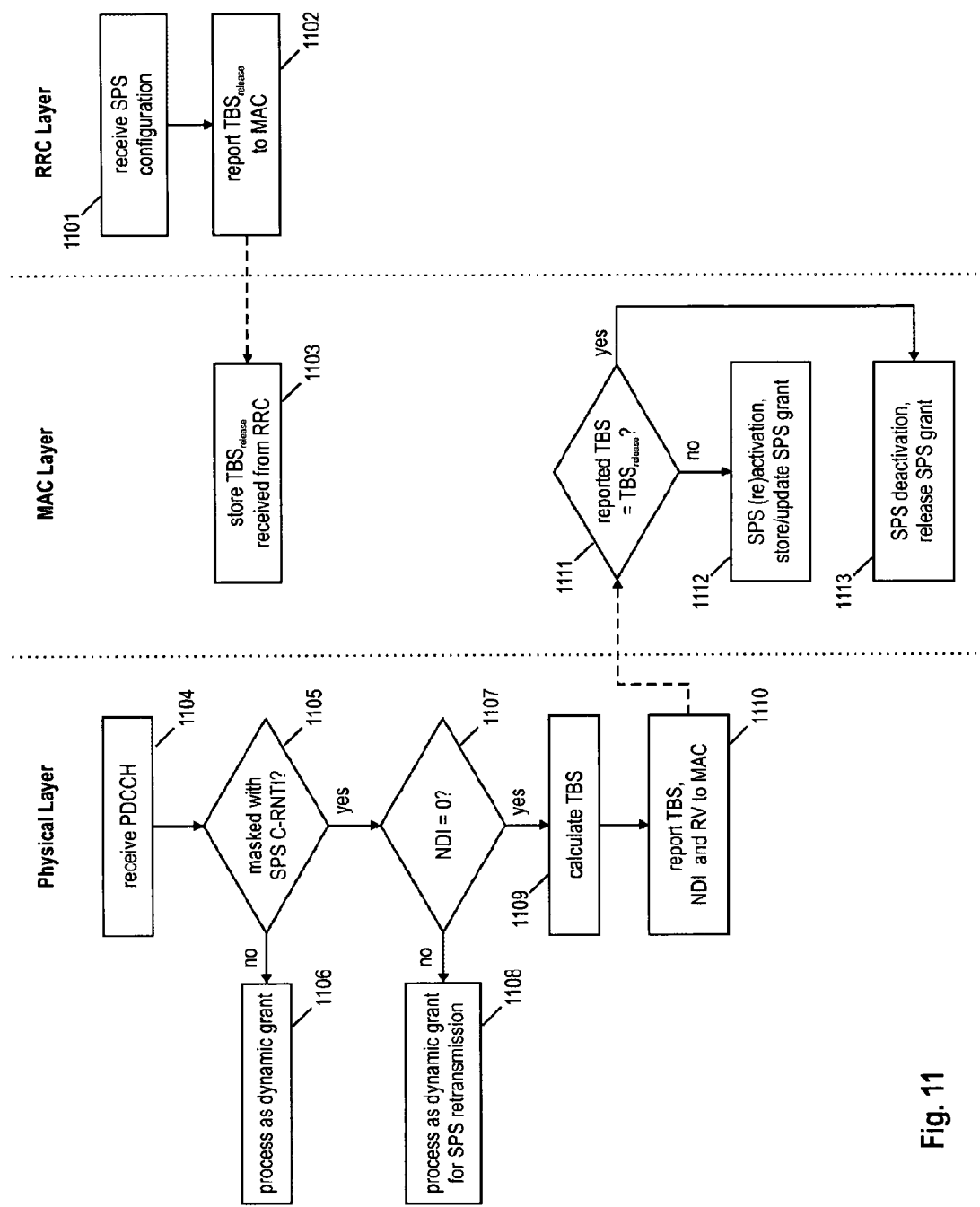
FIG. 11 shows a flow chart of the basic operation of the Physical layer entity, the MAC-layer entity and the RRC entity in a user equipment according to exemplary embodiments of the invention to realize a deactivation of semi-persistent scheduling.

FIG. 11 is showing a flow chart of the operation of Physical layer entity, MAC layer entity and RRC entity within a user equipment according to another embodiment of the invention in case a release TBS is used to indicate a SPS resource release to the user equipment. FIG. 11 is not distinguishing between uplink semi-persistent scheduling and downlink semi-persistent scheduling but the basic steps shown in the flow chart equally apply to both scenarios.

As indicated above, semi-persistent scheduling of the user equipment is configured 1101 by means of a corresponding RRC configuration message as for example exemplarily depicted in FIG. 12 or FIG. 13 that is sent by the serving eNode B. The RRC entity of the user equipment is thus aware of the release TBS (TB S.sub.release) upon having received such configuration message. The RRC entity provides 1102 the release TBS to the MAC layer entity, which is storing 1103 the release TBS.

Upon reception 1104 of a PDCCH at the Physical layer entity of the user equipment, the Physical layer entity is checking 1105, whether the CRC field of the PDCCH has been masked by the eNode B with a SPS C-RNTI of the user equipment, i.e., whether it is destined to the user equipment and whether it is related to semi-persistent scheduling. In case the PDCCH's CRC field is not masked with the SPS C-RNTI of the user equipment, the Physical layer entity processes 1106 the PDCCH as a dynamic grant. Otherwise, the Physical layer entity is checking 1107 next, whether the NDI bit value is set to 0 thereby detecting whether the SPS PDCCH is relating to an activation respectively deactivation of the semi-persistent scheduling or a retransmission of a semi-persistently scheduled initial transmission. In case the SPS PDCCH is for a retransmission of a semi-persistently scheduled initial transmission, the SPS PDCCH is further processed 1108 accordingly.

If the SPS PDCCH indicates an activation respectively deactivation of the semi-persistent scheduling, the Physical layer entity is calculating 1109 the transport block size (TBS) signaled in the SPS PDCCH and is reporting 1110 the transport block size, the NDI and the redundancy version (RV) signaled in the SPS PDCCH to the MAC layer entity. The MAC layer entity checks 1111, whether the SPS PDCCH indicates a transport block size (TBS) that is equal to the release TBS (TBS.sub.release) in order to conclude, whether the SPS PDCCH is signaling an activation or a deactivation of the semi-persistent scheduling.

In case the MAC layer entity of the user equipment determines the transport block size (TBS) signaled within the SPS PDCCH equals the release TBS, the MAC layer entity of the UE will release 1113 the corresponding SPS resource and will deactivate the semi-persistent scheduling. Furthermore, the user equipment processes the received SPS PDCCH in a similar fashion as a dynamic assignment and transmits/receives a data packet accordingly. Otherwise, the MAC layer entity is concluding that the SPS PDCCH is signaling an activation of the semi-persistent scheduling. Accordingly, the MAC layer entity will store/update 1112 the grant of the SPS PDCCH and (re)activate the semi-persistent resource allocation.

The "release TBS" could be a transport block size outside the range of valid transport block sizes for SPS activation (outside the range defined by min TBS and max TBS) or could alternatively be a transport block size within the signaled transport block size range allowed for SPS activation.

The release TBS approach described above in connection with FIGS. 8, 11 and 12 has one potential advantage over the above described solutions where a combination of NDI bit value and modulation and coding scheme index has been used to signal a SPS resource release. With the latter solution an entire PDCCH is required in order to release SPS resources. There is no PDSCH respectively PUSCH allocation possible with this type of release PDCCH, i.e., a release PDCCH that is signaling a predetermined combination of NDI bit value and modulation and coding scheme index cannot be used in order to allocate resource for an uplink transmission or downlink reception, since no transport block size information can be provided by the PDCCH given that a modulation and coding scheme index yielding no transport block size information is used in the combination of NDI bit value and modulation and coding scheme index indicating the SPS resource release.

In contrast thereto when defining a release TBS as described above, it is possible to allocate PDSCH respectively PUSCH with the release PDCCH. As described above in connection with FIG. 8, the user equipment when receiving a SPS PDCCH indicating the release TBS UE will release the corresponding SPS resources and obey the assignment signaled by the SPS PDCCH as in case a normal dynamic grant has been received. It should be noted that even though the PDCCH is addressed with the SPS C-RNTI, the user equipment acts as having received a dynamic resource assignment in parallel to the SPS resource release indication. With respect to the PDCCH resource usage the definition of a release TBS may be thus more efficient compared to the definition of a "release combination" of NDI bit value and modulation and coding scheme index.

On the other hand, the definition of a release TBS will introduce changes to the RRC message configuring the semi-persistent scheduling as the user equipment needs to be informed on the release TBS. To avoid the overhead of the signaling overhead for configuring the release TBS via the RRC message, the release TBS could be a predefined value. Considering the exemplary RRC message format of FIG. 12, one option could be that the "release TBS" field is removed and the release TBS for deactivating semi-persistent scheduling is implicitly given, i.e., the "min TBS" field or the "max TBS" field do not only indicate the valid range of transport block size that is allowed for SPS (re)activation but one of the two transport block sizes could also indicate the release TBS.

Alternatively, considering that the available resource allocation sizes in terms of resource blocks and available modulation and coding schemes for semi-persistent scheduling yield a minimum or maximum transport block size that can be signaled in a PDCCH, the smallest possible transport block size or the highest possible transport block size that can be signaled in the PDCCH could implicitly indicate, i.e., define the release TBS. In this alternative, the transport block size indicating the SPS resource release does not necessarily lie within the range of the valid transport block sizes for an SPS activation.

Furthermore, similar to the example discussed with Table 5 above, also when defining a release TBS for semi-persistent scheduling, individual release TBSs for uplink, downlink and uplink and downlink semi-persistent scheduling could be defined. This is exemplarily shown in FIG. 13, where the fields UL release TBS, DL release TBS and UL and DL release TBS individually indicate the transport block size indicating a release of uplink, downlink and uplink and downlink SPS resources, respectively. In this example, it is optionally further possible to define that the SPS resources are only released in case same are indicated in an SPS DL PDCCH or SPS UL PDCCH.

As a further variant of the second aspect of the invention where a release TBS is used for indicated deactivation of semi-persistent scheduling, the RRC entity of the eNode B could also signal one combination of modulation and coding scheme index and resource allocation size instead of signaling a release TBS. The difference is that there are potentially multiple combinations of modulation and coding scheme indices and resource allocation size values which correspond to the same TB size. In this case the Physical layer would be required to check for an SPS resource release, i.e., check whether the RRC signaled combination of modulation and coding scheme index and resource allocation size was received by a SPS PDCCH and inform MAC layer correspondingly.

In the flow charts of FIGS. 9 to 11, it has been indicated that the Physical layer entity first checks, whether the CRC field of the PDCCH is masked with the user equipment's SPS C-RNTI or not. Of course, the Physical layer entity could also first check, whether the CRC field of the PDCCH is masked with the user equipment's C-RNTI or not to determine whether it is a dynamic grant and, if not, could subsequently check whether the CRC field of the PDCCH is masked with the user equipment's SPS C-RNTI or not.

Another embodiment of the invention relates to the implementation of the above described various embodiments using hardware and software. It is recognized that the various embodiments of the invention may be implemented or performed using computing devices (processors). A computing device or processor may for example be general purpose processors, digital signal processors (DSP), application specific integrated circuits (ASIC), field programmable gate arrays (FPGA) or other programmable logic devices, etc. The various embodiments of the invention may also be performed or embodied by a combination of these devices.

Further, the various embodiments of the invention may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc.

Furthermore, it should be noted that the terms mobile terminal and mobile station are used as synonyms herein. A user equipment may be considered one example for a mobile station and refers to a mobile terminal for use in 3GPP-based networks, such as LTE.

In the previous paragraphs various embodiments of the invention and variations thereof have been described. It would be appreciated by a person skilled in the art that numerous variations and/or modifications may be made to the present invention as shown in the specific embodiments without departing from the spirit or scope of the invention as broadly described.

It should be further noted that most of the embodiments have been outlined in relation to a 3GPP-based communication system and the terminology used in the previous sections mainly relates to the 3GPP terminology. However, the terminology and the description of the various embodiments with respect to 3GPP-based architectures are not intended to limit the principles and ideas of the inventions to such systems.

Also the detailed explanations given in the Technical Background section above are intended to better understand the mostly 3GPP specific exemplary embodiments described herein and should not be understood as limiting the invention to the described specific implementations of processes and functions in the mobile communication network. Nevertheless, the improvements proposed herein may be readily applied in the architectures described in the Technical Background section. Furthermore, the concept of the invention may be also readily used in the LTE RAN currently discussed by the 3GPP.

The invention claimed is:

1. A method for releasing a semi-persistent scheduled (SPS) resource allocation in a mobile communication system, wherein a user equipment performs the steps of:
   receiving control signaling via a physical downlink control channel (PDCCH), and
   releasing the semi-persistent scheduled resource allocation when a set of conditions is met,
   wherein the set of conditions includes a New Data Indicator value of 0 and a modulation and coding scheme index indicating no transport block size information.

2. The method according to claim 1, wherein the control signalling conveys control information for scheduling of a Physical Uplink Shared Channel (PUSCH), and wherein the set of conditions further includes a transmit power control (TPC) field being a defined TPC value.

3. The method according to claim 2, wherein the defined TPC value is '00'.

4. The method according to claim 1, wherein the control signalling conveys control information for scheduling of a Physical Uplink Shared Channel (PUSCH), and wherein the defined set of conditions further includes a cyclic shift demodulation reference signal (DM RS) field being a defined cyclic shift DM RS value.

5. The method according to claim 4, wherein the defined cyclic shift DM RS value is '000'.

6. The method according to claim 1, wherein the control signalling conveys control information for scheduling of a Physical Downlink Shared Channel (PDSCH), and wherein the set of conditions further includes a hybrid automatic repeat request (HARQ) process number field being a defined HARQ process number value.

7. The method according to claim 6, wherein the defined HARQ process number value is '000'.

8. The method according to claim 1, wherein the control signalling conveys control information for scheduling of a Physical Downlink Shared Channel (PDSCH), and wherein the set of conditions further includes a Redundancy Version (RV) field being a defined RV value.

9. The method according to claim 8, wherein the defined RV value is '00'.

10. A user equipment for a mobile communication system, comprising:
    a receiver configured to receive control signaling via a downlink control channel, and
    processing circuitry configured to release a semi-persistent scheduled (SPS) resource allocation when a set of conditions is met,
    wherein the set of conditions includes a New Data Indicator value of 0 and a modulation and coding scheme index indicating no transport block size information.

11. The user equipment according to claim 10, wherein the control signalling conveys control information for scheduling of a Physical Uplink Shared Channel (PUSCH), and wherein the set of conditions further includes a transmit power control (TPC) field being a defined TPC value.

12. The user equipment according to claim 11, wherein the defined TPC value is '00'.

13. The user equipment according to claim 10, wherein the control signalling conveys control information for scheduling of a Physical Uplink Shared Channel (PUSCH), and wherein the set of conditions further includes a cyclic shift demodulation reference signal (DM RS) field being a defined cyclic shift DM RS value.

14. The user equipment according to claim 13, wherein the defined cyclic shift DM RS value is '000'.

15. The user equipment according to claim 10, wherein the control signalling conveys control information for scheduling of a Physical Downlink Shared Channel (PDSCH), and wherein the set of conditions further includes a hybrid automatic repeat request (HARQ) process number field being a defined HARQ process number value.

16. The user equipment according to claim 15, wherein the defined HARQ process number value is '000'.

17. The user equipment according to claim 10, wherein the control signalling conveys control information for scheduling of a Physical Downlink Shared Channel (PDSCH), and wherein the set of conditions further includes a Redundancy Version (RV) field being a defined RV value.

18. The user equipment according to claim 17, wherein the defined RV value is '00'.

* * * * *